United States Patent
Choi et al.

(10) Patent No.: US 12,493,345 B2
(45) Date of Patent: Dec. 9, 2025

(54) HEAD MOUNTED DISPLAY APPARATUS INCLUDING EYE-TRACKING SENSOR AND OPERATING METHOD THEREOF

(71) Applicant: SAMSUNG ELECTRONICS CO., LTD., Suwon-si (KR)

(72) Inventors: Jongchul Choi, Suwon-si (KR); Bonkon Koo, Suwon-si (KR); Sanghyun Yi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/417,584

(22) Filed: Jan. 19, 2024

(65) Prior Publication Data
US 2024/0220008 A1 Jul. 4, 2024

Related U.S. Application Data

(63) Continuation of application No. PCT/KR2023/021990, filed on Dec. 29, 2023.

(30) Foreign Application Priority Data

Dec. 29, 2022 (KR) .................... 10-2022-0189637

(51) Int. Cl.
*G06F 3/01* (2006.01)
*G02B 27/01* (2006.01)
*G06V 40/19* (2022.01)

(52) U.S. Cl.
CPC ......... *G06F 3/013* (2013.01); *G02B 27/0172* (2013.01); *G02B 27/0179* (2013.01);
(Continued)

(58) Field of Classification Search
CPC . G06F 3/013; G02B 27/0172; G02B 27/0179; G02B 2027/0178; G02B 2027/0187; G02B 27/0093; G06V 40/19
See application file for complete search history.

(56) References Cited

U.S. PATENT DOCUMENTS

| 10,345,600 B1 | 7/2019 | Chi et al. |
| 10,416,766 B1 | 9/2019 | Trail et al. |

(Continued)

FOREIGN PATENT DOCUMENTS

| CN | 109645955 A | 4/2019 |
| JP | 2013-187794 A | 9/2013 |

(Continued)

OTHER PUBLICATIONS

International Search Report (PCT/ISA/210) and Written Opinion (PCT/ISA/237) issued by the International Searching Authority on Apr. 3, 2024 in corresponding International Application No. PCT/KR2023/021990.

(Continued)

*Primary Examiner* — Dmitriy Bolotin
(74) *Attorney, Agent, or Firm* — Sughrue Mion, PLLC

(57) ABSTRACT

A head mounted display (HMD) apparatus may include: a display; an optical lens adjacent to a first side of the display; at least one light source configured to emit light; and at least one eye-tracking sensor adjacent to a second side of the display and configured to obtain gaze information about a user by receiving reflected light that is the light emitted from the at least one light source and reflected off eyes of the user. The display may include a second display region corresponding to a position of the at least one eye-tracking sensor, and a first display region other than the second display region. A number of pixels per unit area of the first display region may be greater than a number of pixels per unit area of the second display region.

19 Claims, 12 Drawing Sheets

(52) U.S. Cl.
CPC ...... *G06V 40/19* (2022.01); *G02B 2027/0178* (2013.01); *G02B 2027/0187* (2013.01)

(56) References Cited

U.S. PATENT DOCUMENTS

| | | | |
|---|---|---|---|
| 10,877,556 B2 | 12/2020 | Berkner-Cieslicki et al. | |
| 10,996,752 B1 | 5/2021 | Ouderkirk et al. | |
| 11,231,592 B2 | 1/2022 | Lanman | |
| 11,322,529 B2 | 5/2022 | Wang | |
| 11,330,241 B2 | 5/2022 | Silverstein | |
| 11,515,509 B2 | 11/2022 | Baek et al. | |
| 11,593,914 B2 | 2/2023 | Thiebaud et al. | |
| 2012/0206050 A1* | 8/2012 | Spero | H05B 45/395 315/152 |
| 2013/0286053 A1* | 10/2013 | Fleck | G09G 5/377 345/82 |
| 2016/0246055 A1* | 8/2016 | Border | G02B 27/0172 |
| 2017/0132757 A1 | 5/2017 | Thiebaud et al. | |
| 2017/0186370 A1* | 6/2017 | Lee | G09G 3/3225 |
| 2017/0188006 A1* | 6/2017 | Park | G09G 3/3233 |
| 2017/0205877 A1* | 7/2017 | Qin | G02B 27/0093 |
| 2017/0329398 A1 | 11/2017 | Raffle et al. | |
| 2018/0211448 A1 | 7/2018 | Bar-Zeev et al. | |
| 2018/0307905 A1* | 10/2018 | Gustafsson | G06F 3/012 |
| 2018/0330652 A1* | 11/2018 | Perreault | G02B 27/0172 |
| 2019/0162955 A1* | 5/2019 | Jang | G02B 5/201 |
| 2019/0317598 A1* | 10/2019 | Aleem | H04N 13/383 |
| 2019/0324532 A1* | 10/2019 | Aleem | G06F 3/012 |
| 2020/0159030 A1 | 5/2020 | Ayres et al. | |
| 2020/0204715 A1* | 6/2020 | Ouyang | H10K 59/121 |
| 2020/0295308 A1 | 9/2020 | Baek et al. | |
| 2020/0355929 A1* | 11/2020 | Zhang | G02B 27/425 |
| 2021/0091153 A1 | 3/2021 | Jia | |
| 2021/0376267 A1* | 12/2021 | Zhang | G06F 1/325 |
| 2022/0028335 A1* | 1/2022 | Matsueda | G09G 3/3233 |
| 2022/0050299 A1 | 2/2022 | Hua et al. | |
| 2022/0221721 A1* | 7/2022 | Kim | H04N 23/20 |
| 2022/0229296 A1* | 7/2022 | Song | H01L 27/153 |
| 2022/0229297 A1 | 7/2022 | Lee et al. | |
| 2022/0390657 A1 | 12/2022 | Nakata et al. | |
| 2023/0036762 A1* | 2/2023 | Hong | H04N 13/167 |
| 2023/0144296 A1* | 5/2023 | Tu | G02B 27/30 359/641 |
| 2024/0085707 A1* | 3/2024 | Schowengerdt | G02B 27/0172 |
| 2024/0264450 A1* | 8/2024 | Lee | G02B 27/0093 |

FOREIGN PATENT DOCUMENTS

| | | |
|---|---|---|
| KR | 10-1895085 B1 | 10/2018 |
| KR | 10-2022-0100741 A | 7/2022 |
| KR | 10-2022-0105698 A | 7/2022 |
| KR | 10-2419459 B1 | 7/2022 |

OTHER PUBLICATIONS

Erwan J. David et al., "A Dataset of Head and Eye Movements for 360° Videos", Proceedings of the 9th ACM Multimedia Systems Conference (MMSys '18), Jun. 2018, pp. 432-437, DOI: 10.1145/3204949.3208139.

Communication issued on Oct. 22, 2025 by the European Patent Office in European Patent Application No. 23913027.1.

* cited by examiner

HEAD MOUNTED DISPLAY APPARATUS INCLUDING EYE-TRACKING SENSOR AND OPERATING METHOD THEREOF

CROSS-REFERENCE TO RELATED APPLICATIONS

This application is a Bypass Continuation Application of International Application No. PCT/KR2023/021990, filed on Dec. 29, 2023, which is based on and claims priority to Korean Patent Application No. 10-2022-0189637 filed on Dec. 29, 2022 in the Korean Intellectual Property Office, the disclosures of which are incorporated by reference herein in their entireties.

BACKGROUND

1. Field

The disclosure relates to a head mounted display (HMD) apparatus and an operating method of the HMD apparatus.

2. Description of Related Art

With advancements in technology, head mounted display (HMD) devices have been developed that provide images to a user via a display positioned close to the user's eyes while being worn on the user's head.

A display included in an HMD device may include an optical see-through display for overlaying a virtual image on a real-world physical environment space or a real-world object to show them together, or a video see-through display for displaying an image that is an image of a real-world physical environment space captured by using a camera or the like and presenting the image to the user.

Recently, a technology has been developed that senses a gaze direction of a user wearing an HMD device, corrects an image displayed on a display based on the sensed gaze direction, and presents the image to the user.

SUMMARY

Provided are a head mounted display (HMD) apparatus including a display and an optical lens positioned adjacent to a first side of the display.

According to an aspect of the disclosure, a head mounted display (HMD) apparatus may include: a display; an optical lens adjacent to a first side of the display; at least one light source configured to emit light; and at least one eye-tracking sensor adjacent to a second side of the display and configured to obtain gaze information about a user by receiving reflected light, the reflected light being at least a portion of the light emitted from the at least one light source and reflected from eyes of the user. The display may include a second display region corresponding to a position of the at least one eye-tracking sensor, and a first display region other than the second display region. A number of pixels per unit area of the first display region may be greater than a number of pixels per unit area of the second display region.

The first display region may correspond to a region of interest having a reference radius corresponding to a reference angle, which may be predetermined based on a center of the optical lens, and a distance between the eyes of the user and the optical lens. The second display region may be adjacent to the first display region and outside the region of interest.

The reference angle may be set to an angle in a range of 10° to 40°.

A cross-sectional area of the display may be smaller than a cross-sectional area of the optical lens.

The at least one eye-tracking sensor may be further configured to obtain biometric information about the user by receiving the reflected light.

The display may include: a substrate; a circuit layer on the substrate; and a plurality of pixels on the circuit layer. The first side of the display may be adjacent to the plurality of pixels, and the second side of the display may be adjacent to the substrate.

The substrate may be above the at least one eye-tracking sensor. The at least one eye-tracking sensor overlaps with an area of the substrate corresponding to an outside of the first display region.

The substrate may be above the at least one light source. The at least one light source overlaps with an area of the substrate corresponding to the second display region.

The second display region may include a first sub-display region and a second sub-display region. The at least one eye-tracking sensor may be in the first sub-display region. The at least one light source may be in the second sub-display region.

A first distance between the eyes of the user and the optical lens may be less than a second distance between the eyes of the user and the display.

The display may include a first display corresponding to a left eye of the user and a second display corresponding to a right eye of the user. The optical lens may include a first optical lens corresponding to the first display and a second optical lens corresponding to the second display. The at least one eye-tracking sensor may include at least one first eye-tracking sensor corresponding to the first display and at least one second eye-tracking sensor corresponding to the second display.

The at least one light source may include at least one first eye-tracking light source corresponding to the first display and at least one second eye-tracking light source corresponding to the second display.

Transmittance of the second display region may be greater than transmittance of the first display region.

Each of the plurality of pixels may include an organic light emitting diode (OLED).

According to an aspect of the disclosure, a head mounted display (HMD) apparatus may include: a display; an optical lens adjacent to a first side of the display; at least one light source configured to emit light; at least one eye-tracking sensor adjacent to a second side of the display and configured to receive reflected light, the reflected light being at least a portion of the light emitted from the at least one light source and reflected from eyes of the user; a memory storing at least one instruction; and at least one processor configured to execute the at least one instruction stored in the memory to obtain gaze information about the user based on the reflected light received by the at least one eye-tracking sensor. The display may include a second display region corresponding to a position of the at least one eye-tracking sensor, and a first display region other than the second display region. A number of pixels per unit area of the first display region may be greater than a number of pixels per unit area of the second display region.

The first display region corresponds to a region of interest that may be a region having a reference radius corresponding to a reference angle, which may be predetermined based on a center of the optical lens, and a distance between the eyes of the user and the optical lens. The second display region may be adjacent to the first display region and outside the region of interest. The reference angle may be set to an angle in a range of 10° to 40°.

The display may include a first display corresponding to a left eye of the user and a second display corresponding to a right eye of the user. The optical lens may include a first optical lens corresponding to the first display and a second optical lens corresponding to the second display. The at least one eye-tracking sensor may include at least one first eye-tracking sensor corresponding to the first display and at least one second eye-tracking sensor corresponding to the second display. The at least one light source may include at least one first eye-tracking light source corresponding to the first display and at least one second eye-tracking light source corresponding to the second display.

According to an aspect of the disclosure, an operating method of a head mounted display (HMD) apparatus may include a display and an optical lens adjacent to a first side of the display. The operating method may include: emitting, by at least one light source of the HMD apparatus, light toward eyes of a user; receiving, by at least one eye-tracking sensor of the HMD apparatus adjacent to a second side of the display, reflected light, the reflected light being at least a portion of the light emitted from the at least one light source and reflected from the eyes of the user; and obtaining gaze information about the user based on the reflected light. The display may include a second display region corresponding to a position where the at least one eye-tracking sensor, and a first display region other than the second display region. A number of pixels per unit area of the first display region may be greater than a number of pixels per unit area of the second display region.

The first display region corresponds to a region of interest having a reference radius corresponding to a reference angle, which may be predetermined based on a center of the optical lens, and a distance between the eyes of the user and the optical lens. The second display region may be adjacent to the first display region and outside the region of interest. The reference angle may be set to an angle in a range of 10° to 40°.

The display may include a first display corresponding to a left eye of the user and a second display corresponding to a right eye of the user. The optical lens may include a first optical lens corresponding to the first display and a second optical lens corresponding to the second display,

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
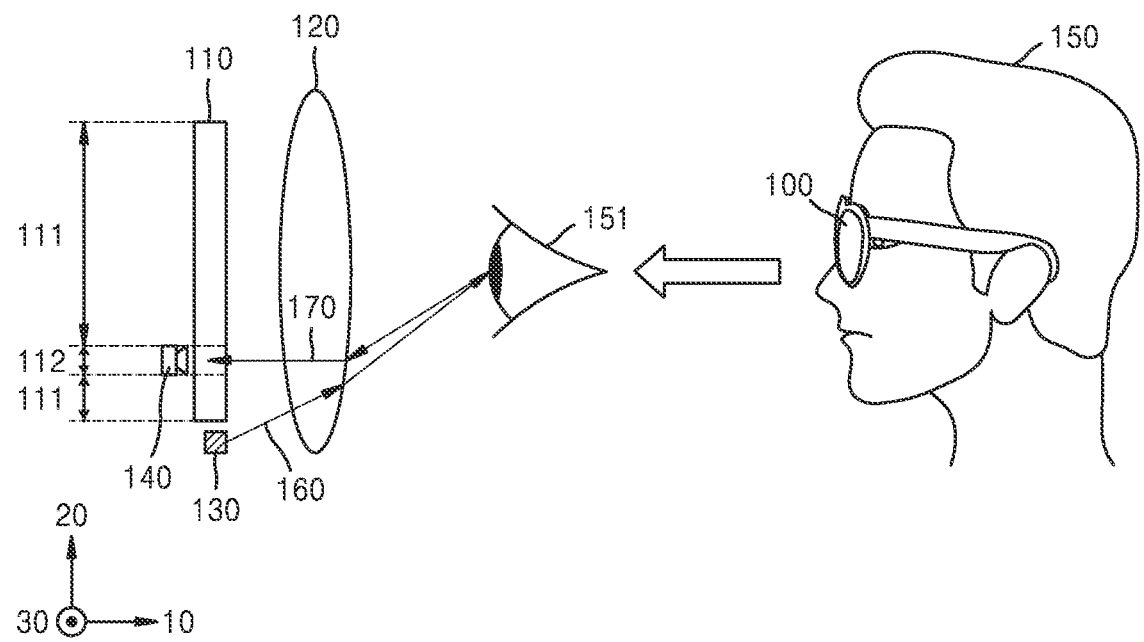
FIG. 1 is a diagram illustrating a head mounted display (HMD) apparatus according to an embodiment of the disclosure.

Terms used in the disclosure will now be briefly described and then embodiments of the disclosure will be described in detail.

As the terms used herein, general terms that are currently widely used are selected by taking functions in the disclosure into account, but may be changed according to an intention of one of ordinary skill in the art, precedent cases, advent of new technologies, etc. Furthermore, specific terms may be arbitrarily selected by the applicant, and in this case, the meaning of the selected terms will be described in detail in the detailed description of a corresponding embodiment of the disclosure. Thus, the terms used herein should be defined not by simple appellations thereof but based on the meaning of the terms together with the overall description of the disclosure.

Singular expressions used herein are intended to include plural expressions as well unless the context clearly indicates otherwise. All the terms used herein, which include technical or scientific terms, may have the same meaning that is generally understood by a person of ordinary skill in the art of the disclosure.

Throughout the disclosure, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation, and may be embodied as hardware or software or a combination of hardware and software.

The expression "configured to (or set to)" used in the disclosure may be used interchangeably, according to context, with, for example, the expression "suitable for," "having the capacity to," "designed to," "adapted to," "made to," or "capable of". The term "configured to (or set to)" may not necessarily mean only "specifically designed to" in terms of hardware. Instead, the expression "a system configured to"

may mean, in some contexts, the system being "capable of", together with other devices or components. For example, the expression "a processor configured to (or set to) perform A, B, and C" may mean a dedicated processor (e.g., an embedded processor) for performing the corresponding operations, or a general-purpose processor (e.g., a central processing unit (CPU) or an application processor (AP)) capable of performing the corresponding operations by executing one or more software programs stored in a memory.

Furthermore, in the disclosure, it should be understood that when a component is referred to as being "connected" or "coupled" to another component, the component may be directly connected or coupled to the other component, but may also be connected or coupled to the other component via another intervening component therebetween unless there is a particular description contrary thereto.

As used herein, an "electronic device" may be a head mounted display (HMD) apparatus. However, the disclosure is not limited thereto, and an "electronic device" may be implemented as various forms of electronic devices such as a TV, a mobile device, a smartphone, a laptop computer, a desktop, a tablet PC, an e-book terminal, a digital broadcasting terminal, a personal digital assistant (PDA), a portable multimedia player (PMP), a wearable device, etc.

In the disclosure, 'central vision' may refer to a field of view used when observing an area on which a user's gaze is focused. The central vision may refer to the field of view used to observe an area disposed in a center of a user's visual field.

As used herein, 'peripheral vision' may refer to a field of view used when observing an area surrounding the area on which a user's gaze is focused. The peripheral vision may refer to the field of view used to observe an area adjacent to the center of the user's visual field.

As used herein, a 'reference angle' may be an angle set to correspond to an angle that is determined, based on human factors, to be a maximum angle at which, when a user who views an image by using an HMD apparatus focuses a user's gaze on an image displayed on the display, the user moves his or her eyes to change an area of focus without turning the head from an area of the display on which the user's gaze is initially focused.

As used herein, a 'region of interest' is an area where the user is able to observe an image displayed on a display with central vision by moving only the user's eyes without moving the head.

An embodiment of the disclosure will be described more fully hereinafter with reference to the accompanying drawings so that the embodiment may be easily implemented by one of ordinary skill in the art. However, an embodiment of the disclosure may be implemented in different forms and should not be construed as being limited to embodiments of the disclosure set forth herein. In addition, parts not related to descriptions are omitted to clearly explain an embodiment of the disclosure in the drawings, and like reference numerals denote like elements throughout.

Hereinafter, embodiments of the disclosure are described in detail with reference to the accompanying drawings.

FIG. 1 is a conceptual diagram for describing an HMD apparatus according to an embodiment of the disclosure.

Referring to FIG. 1, an electronic device according to an embodiment of the disclosure may provide content to a user 150 wearing the electronic device. In an embodiment of the disclosure, the electronic device is a device capable of providing content to the user 150, and may be an HMD apparatus 100. In an embodiment of the disclosure, FIG. 1 shows the electronic device having a shape similar to eyeglasses, including a support portion spanning a face of the user 150. However, the disclosure is not limited thereto, and the electronic device may include a support portion spanning the face and the head of the user 150. Furthermore, in an embodiment of the disclosure, the electronic device is not limited to an HMD apparatus, but may be implemented as various forms of electronic devices such as a TV, a mobile device, a smartphone, a laptop computer, a desktop, a tablet PC, an e-book terminal, a digital broadcasting terminal, a PDA, a PMP, a wearable device, etc. Hereinafter, for convenience of descriptions, the electronic device is described as the HMD apparatus 100.

In an embodiment of the disclosure, the HMD apparatus 100 may include a display 110 displaying an image and an optical lens 120. The image provided by the display 110 may be refracted, reflected, or dispersed through the optical lens 120 and provided to the user 150.

In an embodiment of the disclosure, the HMD apparatus 100 may display, on the display 110, an image generated based on externally provided data or data pre-stored in the HMD apparatus 100 and provide the image to the user 150. In an embodiment of the disclosure, the HMD apparatus 100 may receive data including information about an image to be displayed on the display 110 from an external electronic device.

However, the disclosure is not limited thereto. The HMD apparatus 100 may be a video see-through electronic device that obtains an image of a physical environment space where a gaze of the user 150 is directed, which is captured by using a camera, and then provides the obtained image to the user 150 via the display 110.

In an embodiment of the disclosure, the HMD apparatus 100 may include at least one light source 130. The at least one light source 130 may emit light 160 toward eyes 151 of the user 150 wearing the HMD apparatus 100. In an embodiment of the disclosure, the light 160 provided by the at least one light source 130 may be refracted, reflected, or dispersed through the optical lens 120 to illuminate the user's eyes 151.

In an embodiment of the disclosure, the HMD apparatus 100 may include at least one eye-tracking sensor 140. The at least one eye-tracking sensor 140 may receive reflected light 170 obtained when the light 160 emitted from the at least one light source 130 is reflected off the user's eyes 151. The at least one eye-tracking sensor 140 may receive the reflected light 170 obtained when the light provided by the at least one light source 130 for eye tracking is reflected off the user's eyes 151. In an embodiment of the disclosure, the at least one eye-tracking sensor 140 may receive the reflected light 170 that is refracted, reflected, or dispersed through the optical lens 120.

In an embodiment of the disclosure, the HMD apparatus 100 may obtain gaze information of the user 150 by using the at least one light source 130 and the at least one eye-tracking sensor 140. In an embodiment of the disclosure, the HMD apparatus 100 may obtain biometric information about the user 150 by using the at least one light source 130 and the at least one eye-tracking sensor 140. In an embodiment of the disclosure, the gaze information of the user 150 may include a direction of a gaze of the user 150, a distance between the user's eyes 151 eyes 151 and the optical lens 120, a point of view where the gaze of the user 150 intersects the optical lens 120, and a point of view where the gaze of the user 150 intersects the display 110. In an embodiment of the disclosure, the HMD apparatus 100 may obtain iris patterns of the user's eyes 151 or images of eyeballs of the user 150 by using the at least one eye-tracking sensor 140. The HMD apparatus 100 may obtain biometric information about the user 150, based on the iris patterns of the user's eyes 151 or the images of the eyeballs of the user 150. In an embodiment of the disclosure, the biometric information about the user 150 may include an image of an iris of the user's eyes 151, an image of a retina of the user's eyes 151, a vein pattern inside the user's eyes 151, visual acuity of the user's eye 151, information about disease present in the user's eyes 151, etc.

For convenience of descriptions, the at least one light source 130 is hereinafter referred to as the at least one eye-tracking light source 130.

In an embodiment of the disclosure, the HMD apparatus 100 may track a gaze of the user 150 and obtain information about a direction of the gaze of the user 150.

In an embodiment of the disclosure, the HMD apparatus 100 may calculate at least one of a distance between the user's eyes 151 and the optical lens 120 or a distance between the user's eyes 151 and the display 110 by using the at least one eye-tracking light source 130 and the at least one eye-tracking sensor 140.

In an embodiment of the disclosure, the HMD apparatus 100 may identify a point of view where the gaze of the user 150 intersects the optical lens 120, based on the obtained information about the direction of the gaze of the user 150 and distance between the user's eyes 151 and the optical lens 120. The HMD apparatus 100 may identify a point of view where the gaze of the user 150 intersects the display 110, based on the obtained information about the direction of the gaze of the user 150 and distance between the user's eyes 151 and the display 110.

In FIG. 1 and the following figures, a first direction axis 10, a second direction axis 20, and a third direction axis 30 are shown, and directions indicated by the first direction axis 10, the second direction axis 20, and the third direction axis 30 as described in the disclosure are relative concepts and may be changed to other directions. In addition, the directions respectively indicated by the first direction axis 10, the second direction axis 20, and the third direction axis 30 may be respectively described as a first direction, a second direction, and a third direction. In the disclosure, the first direction axis 10 and the second direction axis 20 are directions orthogonal to each other, and the third direction axis 30 may be a direction normal to a plane defined by the first direction axis 10 and the second direction axis 20.

In the disclosure, front (or top) and rear (or bottom) sides of the HMD apparatus 100 may be defined based on the first direction axis 10. As used herein, "overlapping" may mean overlapping with respect to the first direction axis 10. As used herein, "included within" may mean included within a corresponding region with respect to the first direction axis 10. In addition, as used herein, "disposed" or "arranged" may mean disposed or arranged with respect to the first direction axis 10. However, the disclosure is not limited thereto, and may be described with respect to cases where components overlap or are arranged with respect to the second direction axis 20 or third direction axis 30 when necessary.

In an embodiment of the disclosure, a first distance between the optical lens 120 and the user's eyes 151 along the first direction axis 10 may be less than a second distance between the display 110 and the user's eyes 151 along the first direction axis 10. An arrangement relationship between the optical lens 120 and the display 110 is described below with reference to FIGS. 9 and 10.

In an embodiment of the disclosure, FIG. 1 shows the at least one eye-tracking light source 130 is arranged at a location spaced apart from the display 110 along the second direction axis 20. The at least one eye-tracking light source 130 arranged at the location spaced apart from the display 110 along the second direction axis 20 may not overlap with the display 110. The at least one eye-tracking light source 130 may be arranged outside a first display region 111 and a second display region 112. However, the disclosure is not limited thereto. The at least one eye-tracking light source 130 may be arranged at a location spaced apart from the display 110 along the first direction axis 10. The at least one eye-tracking light source 130 arranged at the location spaced apart from the display 110 along the first direction axis 10 and the display 110 may overlap with the display 110. The at least one eye-tracking light source 130 may be included within the second display region 112.

In an embodiment of the disclosure, the at least one eye-tracking light source 130 may overlap with the optical lens 120.

An arrangement relationship among the at least one eye-tracking light source 130, the display 110, and the optical lens 120 is described below in the description with reference to FIGS. 5 to 10.

In an embodiment of the disclosure, the at least one eye-tracking sensor 140 may be arranged at a location spaced apart from the display 110 along the first direction axis 10. With respect to the first direction axis 10, a third distance between the at least one eye-tracking sensor 140 and the user's eyes 151 may be greater than the second distance between the display 110 and the user's eyes 151.

In an embodiment of the disclosure, a display region where an image is displayed on the display 110 may include the first display region 111 and the second display region 112. A resolution of the first display region 111 may be greater than a resolution of the second display region 112. The number of pixels per unit area of the first display region 111 may be greater than the number of pixels per unit area of the second display region 112.

The at least one eye-tracking sensor 140 may overlap with the second display region 112 the second display region 112 of the display 110 with respect to the first direction axis 10. The at least one eye-tracking sensor 140 may be arranged on an inside of the second display region 112 of the display 110. In an embodiment of the disclosure, the inside of the second display region 112 refers to an area included in the second display region 112 in a plane defined by the second direction axis 20 and the third direction axis 30. In an embodiment of the disclosure, the second display region 112 may be a region corresponding to a location where the at least one eye-tracking sensor 140 is positioned. The first display region 111 may not overlap the at least one eye-tracking sensor 140 with respect to the first direction axis 10 of the display 110. The at least one eye-tracking sensor 140 may be arranged outside the first display region 111. In an embodiment of the disclosure, the first display region 111 may be a region other than the second display region 112. In an embodiment of the disclosure, the at least one eye-tracking sensor 140 and the optical lens 120 may overlap with respect to the first direction axis 10.

An arrangement relationship among the at least one eye-tracking sensor 140, the display 110, and the optical lens 120 is described later in the description with reference to FIGS. 5 to 10.

The HMD apparatus 100 of the disclosure may have the at least one eye-tracking sensor 140 arranged to be included within the second display region 112 of the display 110 with respect to the first direction axis 10, such that the at least one eye-tracking sensor 140 is close in distance to the user's eyes 151 on the plane defined by the second direction axis 20 and the third direction axis 30. According to the disclosure, even when the user 150 moves the user's eyes 151 to observe an image displayed on the display 110 (e.g., moves it in a direction away from the location where the at least one eye-tracking sensor 140 is arranged), the at least one eye-tracking sensor 140 may receive the reflected light 170 that is light reflected off the user's eyes 151. Thus, light reception performance of the at least one eye-tracking sensor 140 may be improved.

Furthermore, in the HMD apparatus 100 of the disclosure, the second display region 112 having a smaller number of pixels per unit area than the first display region 111 may be arranged outside a region of interest (550 of FIG. 5) as described later to improve the light reception performance of the at least one eye-tracking sensor 140, thereby preventing a difference in image quality due to the lower resolution of the second display region 112 from being visually perceived by the user 150.

Figure 2:
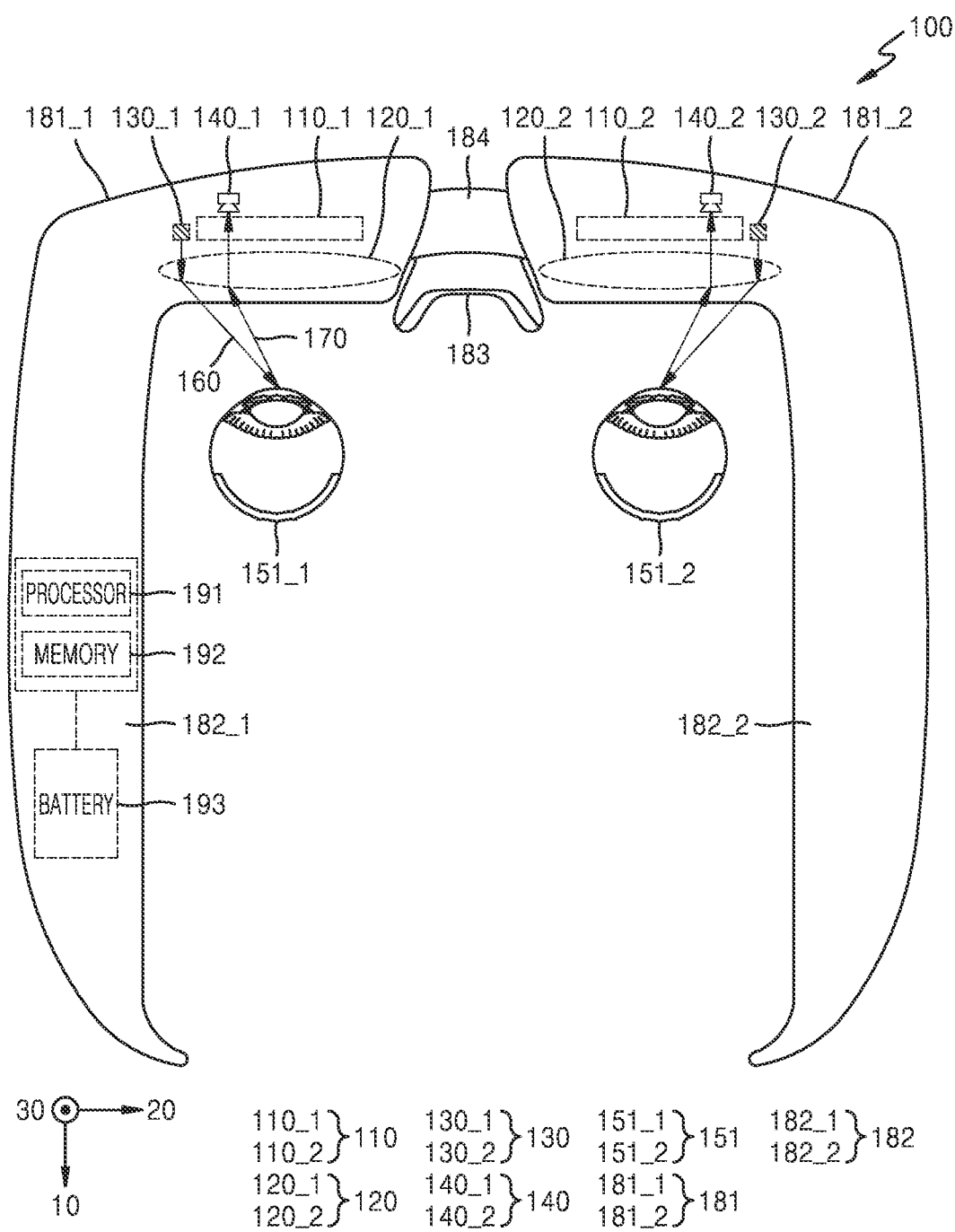
FIG. 2 is a plan view illustrating a configuration of an HMD apparatus according to an embodiment of the disclosure.

FIG. 2 is a plan view illustrating a configuration of an HMD apparatus according to an embodiment of the disclosure. Hereinafter, components identical to those described with reference to FIG. 1 will be assigned the same reference numerals, and descriptions already provided above will be omitted.

Referring to FIG. 2, an HMD apparatus 100 may include a display 110, an optical lens 120, at least one eye-tracking light source 130, at least one eye-tracking sensor 140, a frame 181, a temple 182, a nose support 183, a nose bridge 184, at least one processor 191, a memory 192, and a battery 193. In an embodiment of the disclosure, only components for describing the structure of the HMD apparatus 100 are shown in FIG. 2, and the components included in the HMD apparatus 100 are not limited to those shown in FIG. 2. In an embodiment of the disclosure, the HMD apparatus 100 may include a camera or the like for capturing an image of a physical environment space in the real world.

In an embodiment of the disclosure, the display 110 and the optical lens 120 may each be disposed on the frame 181. The frame 181 may have a shape similar to that of a frame of a general eyeglass structure. The frame 181 may include a rim surrounding the display 110 and the optical lens 120.

In an embodiment of the disclosure, the display 110 may include a first display 110_1 corresponding to a user's left eye 151_1 and a second display 110_2 corresponding to the user's right eye 151_2.

In an embodiment of the disclosure, the optical lens 120 may include a first optical lens 120_1 corresponding to the user's left eye 151_1 and a second optical lens 120_2 corresponding to the user's right eye 151_2. The first optical lens 120_1 may correspond to the first display 110_1, and the second optical lens 120_2 may correspond to the second display 110_2.

In an embodiment of the disclosure, the at least one eye-tracking light source 130 may include a first eye-tracking light source 130_1 corresponding to the user's left eye 151_1 and a second eye-tracking light source 130_2 corresponding to the user's right eye 151_2. The first eye-tracking light source 130_1 may correspond to the first display 110_1, and the second eye-tracking light source 130_2 may correspond to the second display 110_2.

In an embodiment of the disclosure, the at least one eye-tracking sensor 140 may include a first eye-tracking sensor 140_1 corresponding to the user's left eye 151_1 and a second eye-tracking sensor 140_2 corresponding to the user's right eye 151_2. The first eye-tracking sensor 140_1 may correspond to the first display 110_1, and the second eye-tracking sensor 140_2 may correspond to the second display 110_2.

In an embodiment of the disclosure, the frame 181 may include a first frame 181_1 corresponding to the user's left eye 151_1 and a second frame 181_2 corresponding to the user's right eye 151_2. The first frame 181_1 may include a rim surrounding the first display 110_1 and the first optical lens 120_1. The second frame 181_2 may include a rim surrounding the second display 110_2 and the second optical lens 120_2.

In an embodiment of the disclosure, the first display 110_1, the first optical lens 120_1, the first eye-tracking light source 130_1, and the first eye-tracking sensor 140_1 may be disposed on the first frame 181_1. In an embodiment of the disclosure, the second display 110_2, the second optical lens 120_2, the second eye-tracking light source 130_2, and the second eye-tracking sensor 140_2 may be disposed on the second frame 181_2.

However, the disclosure is not limited thereto. The first display 110_1 and the second display 110_2 may be integrally formed and disposed on the frame 181. The first optical lens 120_1 and the second optical lens 120_2 may be integrally formed and disposed on the frame 181.

In an embodiment of the disclosure, the temple 182 may be connected to the frame 181. The temple 182 is a portion that supports the HMD apparatus 100 by resting on the ears of the user 150 when the user 150 wears the HMD apparatus 100. In an embodiment of the disclosure, the temple 182 may include a first temple 182_1 connected to the first frame 181_1 and a second temple 182_2 connected to the second frame 181_2.

In an embodiment of the disclosure, the at least one processor 191, the memory 192, and the battery 193 included in the HMD apparatus 100 may be embedded in the temple 182. Although FIG. 2 shows the at least one processor 191, the memory 192, and the battery 193 are embedded in the first temple 182_1, this is merely an exemplary structure, and the disclosure is not limited to that shown in FIG. 2.

In an embodiment of the disclosure, the nose support 183 may be connected to the frame 181. The nose support 183 is a portion that supports the HMD apparatus 100 by resting on the nose of the user 150 when the user 150 wears the HMD apparatus 100. In an embodiment of the disclosure, the nose support 183 may include a bridge and nose pads. Furthermore, the bridge and the nose pads may be integrally formed, but are not limited thereto. In an embodiment of the disclosure, the nose support 183 may be integrated with the frame 181.

In an embodiment of the disclosure, the nose bridge 184 is a support that connects the first frame 181_1 to the second frame 181_2. The nose bridge 184 may be connected to the nose support 183. However, when the first frame 181_1 and the second frame 181_2 are integrally formed, the HMD apparatus 100 may not include the nose bridge 184.

In an embodiment of the disclosure, the at least one eye-tracking light source 130 may emit light 160 toward the eyes 151 of the user wearing the HMD apparatus 100 through the optical lens 120. The configuration, operation, and function of the at least one eye-tracking light source 130 are described in detail with reference to FIG. 3.

In an embodiment of the disclosure, the at least one eye-tracking sensor 140 may receive reflected light 170, which is light reflected from the eyes 151 of the user wearing the HMD apparatus 100, through the optical lens 120. The configuration, operation, and function of the at least one eye-tracking sensor 140 are described in detail with reference to FIG. 3.

In an embodiment of the disclosure, the battery 193 may be electrically and/or physically connected to the at least one eye-tracking light source 130, the at least one eye-tracking sensor 140, the at least one processor 191, and the memory 192. The battery 193 may supply driving power to the at least one eye-tracking light source 130 and the at least one eye-tracking sensor 140 according to control by the at least one processor 191.

In an embodiment of the disclosure, the battery 193 may include at least one battery module composed of rechargeable secondary batteries. The battery 193 may include, for example, a lithium (Li)-ion battery, a Li-ion polymer battery (LIPB), a nickel (Ni)-cadmium (Cd) battery, a Ni-metal hydride (MH) battery, or the like, but is not limited thereto.

The specific configuration, operation, and function of the processor 191 and the memory 192 are described in detail with reference to FIG. 3.

Figure 3:
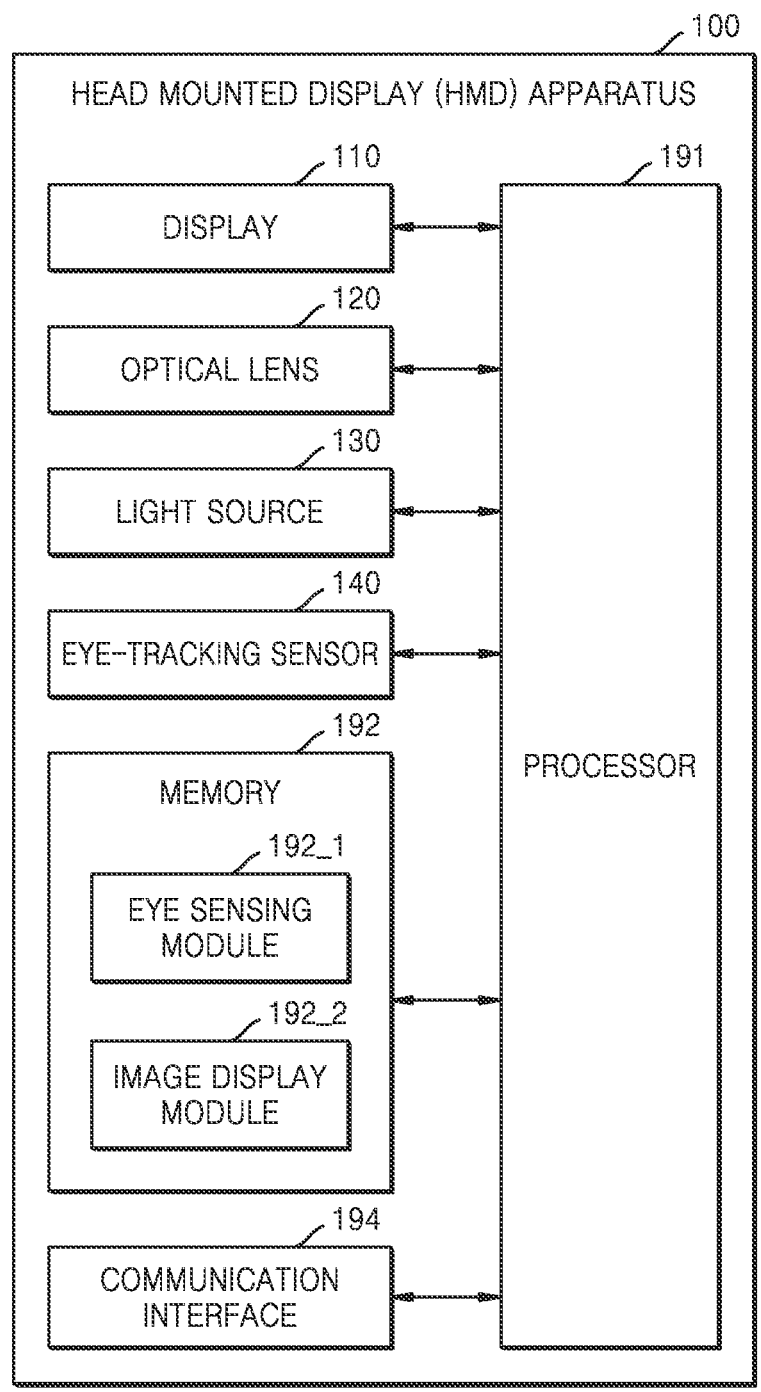
FIG. 3 is a block diagram for describing an HMD apparatus and an operating method of the HMD apparatus, according to an embodiment of the disclosure.

FIG. 3 is a block diagram for describing an HMD apparatus and an operating method of the HMD apparatus, according to an embodiment of the disclosure. Hereinafter, components identical to those described with reference to FIGS. 1 and 2 will be assigned the same reference numerals, and descriptions already provided above will be omitted.

Referring to FIGS. 1 to 3, the HMD apparatus 100 may include the display 110, the optical lens 120, the at least one eye-tracking light source 130, the at least one eye-tracking sensor 140, the at least one processor 191, the memory 192 storing at least one instruction, and a communication interface 194. However, all of the components shown in FIG. 3 are not essential components. The HMD apparatus 100 may be implemented with more or fewer components than those shown in FIG. 3. In an embodiment of the disclosure, the HMD apparatus 100 may further include at least one of a camera for photographing a real-world space where a gaze of the user 150 is directed or the battery 193 for supplying driving power to each of the display 110, the at least one eye-tracking light source 130, the at least one eye-tracking sensor 140, and the at least one processor 191.

In an embodiment of the disclosure, the display 110, the optical lens 120, the at least one eye-tracking light source 130, the at least one eye-tracking sensor 140, the at least one processor 191, the memory 192, and the communication interface 194 may be electrically and/or physically connected to each other.

In an embodiment of the disclosure, the display 110 may include one of an organic light emitting diode (OLED) display and an inorganic LED display. However, the disclosure is not limited thereto, and the display 110 may include other types of displays capable of providing content to the user.

In an embodiment of the disclosure, the optical lens 120 may include one of glass and an electrically tunable liquid crystal lens including liquid crystal molecules. However, the disclosure is not limited thereto, and the optical lens 120 may include a material and the like capable of changing the optical properties of light incident on the optical lens 120 through refraction, reflection, or dispersion. Furthermore, while FIG. 1 shows the optical lens 120 includes a single lens, the disclosure is not limited thereto. The optical lens 120 may include a plurality of lenses, and in this case, each of the plurality of lenses may have a different shape, size, refractive index, etc.

In an embodiment of the disclosure, the at least one eye-tracking light source 130 may be configured to emit the light 160 toward the eyes 151 of the user wearing the HMD apparatus 100. In an embodiment of the disclosure, the light 160 emitted from the at least one eye-tracking light source 130 toward the user's eyes 151 may be an infrared (IR) ray.

In an embodiment of the disclosure, when the at least one eye-tracking light source 130 includes an IR light emitting diode (LED) that emits IR rays, the at least one eye-tracking light source 130 may emit IR rays in the form of planar light toward the user's eyes 151.

In an embodiment of the disclosure, when the at least one eye-tracking light source 130 includes an IR scanner (e.g., a microelectromechanical systems (MEMS) scanner) that emits IR light, the at least one eye-tracking light source 130 may emit IR rays in the form of point light or line light toward the user's eyes 151. The at least one eye-tracking light source 130 may emit IR rays while changing its direction of emission to cover a space where the user's eyes 151 are disposed.

In an embodiment of the disclosure, the at least one eye-tracking sensor 140 may be configured to receive reflected light 170 that is light reflected from the user's eyes 151. In an embodiment of the disclosure, the reflected light 170 from the user's eyes 151 may be IR light. The at least one eye-tracking sensor 140 may include an IR detector (e.g., a photodiode) capable of receiving IR light.

In an embodiment of the disclosure, at least one eye-tracking sensor 140 may include an IR camera. The at least one eye-tracking sensor 140 may obtain eye images by capturing images of the user's eyes 151 via an IR camera, and obtain gaze information of the user 150 from the eye images.

In an embodiment of the disclosure, the memory 192 may include at least one type of storage medium, i.e., at least one of a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a mask ROM, flash ROM, hard disk drive (HDD), or solid-state drive (SSD). The memory 192 may store at least one instruction or program code for performing functions or operations of the HMD apparatus 100. At least one instruction, algorithm, data structure, program code, and application program stored in the memory 192 may be implemented in programming or scripting languages such as C, C++, Java, assembler, etc.

In an embodiment of the disclosure, an eye sensing module 192_3 and an image display module 192_4 may be stored in the memory 192. However, the memory 192 may store more or fewer modules than those shown in FIG. 3.

A 'module' included in the memory 192 may refer to a unit for processing functions or operations performed by the at least one processor 191. The 'module' included in the memory 192 may be implemented as software such as at least one instruction, algorithm, data structure, or program code.

In an embodiment of the disclosure, the eye sensing module 192_3 may be composed of instructions or program code related to an operation or function of obtaining at least one of gaze information of the user 150 or biometric information about the user 150 based on the reflected light 170 obtained via the at least one eye-tracking sensor 140.

In an embodiment of the disclosure, the eye sensing module 192_3 may be composed of instructions or program code related to an operation or function of obtaining information about a direction of a gaze of the user 150 based on the reflected light 170 obtained via the at least one eye-tracking sensor 140. The eye sensing module 192_3 may be composed of instructions or program code related to an operation or function of obtaining information about the direction of the gaze of the user 150 by detecting, for example, a direction or intensity of the reflected light 170 that is light reflected from the user's eyes 151. In an embodiment of the disclosure, the eye sensing module 192_3 may be composed of instructions or program code related to an operation or function of obtaining information about the direction of the gaze of the user 150 by detecting images of eyeballs or pupils from eye images obtained via the at least one eye-tracking sensor 140. In an embodiment of the disclosure, the eye sensing module 192_3 may be composed of instructions or program code related to an operation or function of obtaining biometric information about the user 150 by detecting the images of the eyeballs or pupils from the eye images obtained via the at least one eye-tracking sensor 140, wherein the biometric information includes an iris pattern of each of the user's eyes 151, an image of an iris of each of the user's eyes 151, an image of a retina of each of the user's eyes 151, vein patterns inside the user's eyes 151, visual acuity of the user's eyes 151, information about disease present in the user's eyes 151, etc.

In an embodiment of the disclosure, the at least one processor 191 may execute instructions or program code of the eye sensing module 192_3 to obtain the direction of the gaze of the user 150 based on the reflected light 170 obtained via the at least one eye-tracking sensor 140.

In an embodiment of the disclosure, the eye sensing module 192_3 may be composed of instructions or program code related to an operation or function of calculating, based on the reflected light 170 obtained via the at least one eye-tracking sensor 140, at least one of a distance between the user's eyes 151 and the optical lens 120 or a distance between the user's eyes 151 and the display 110.

In an embodiment of the disclosure, the at least one processor 191 may execute the instructions or program code of the eye sensing module 192_3 to calculate, based on the reflected light 170 obtained via at least one eye-tracking sensor 140, at least one of the distance between the user's eyes 151 and the optical lens 120 or the distance between the user's eyes 151 and the display 110.

In an embodiment of the disclosure, the eye sensing module 192_3 may be composed of instructions or program code related to an operation or function of identifying a point of view where the gaze of the user 150 intersects the optical lens 120, based on the obtained direction of the gaze of the user 150 and distance between the user's eyes 151 and the optical lens 120.

In an embodiment of the disclosure, the at least one processor 191 may execute the instructions or program code of the eye sensing module 192_3 to identify the point of view where the gaze of the user 150 intersects the optical lens 120, based on the direction of the gaze of the user 150 and the distance between the user's eyes 151 and the optical lens 120.

In an embodiment of the disclosure, the eye sensing module 192_3 may be composed of instructions or program code related to an operation or function of identifying a point of view where the gaze of the user 150 intersects the display 110, based on the obtained direction of the gaze of the user 150 and distance between the user's eyes 151 and the display 110.

In an embodiment of the disclosure, the at least one processor 191 may execute the instructions or program code of the eye sensing module 192_3 to identify the point of view where the gaze of the user 150 intersects the display 110, based on the direction of the gaze of the user 150 and the distance between the user's eyes 151 and the display 110.

In an embodiment of the disclosure, the image display module 192_4 may be composed of instructions or program code related to an operation or function of displaying an image on the display 110. In an embodiment of the disclosure, the image display module 192_4 may be composed of instructions or program code about an operation or function of changing an image displayed on the display 110 in correspondence with at least one of the identified point of view where the gaze of the user 150 intersects the optical lens 120 or the identified point of view where the gaze of the user 150 intersects the display 110 and then displaying the changed image on the display 110.

In an embodiment of the disclosure, the image display module 192_4 may be composed of instructions or program code about an operation or function of displaying an image, which corresponds to at least one of the identified point of view where the gaze of the user 150 intersects the optical lens 120 or the identified point of view where the gaze of the user 150 intersects the display 110 among images, so that at least one of a resolution, luminance, or contrast ratio is higher than at least one of a resolution, luminance, or contrast ratio of the remaining images not corresponding to the at least one of the points of view.

In an embodiment of the disclosure, the at least one processor 191 may execute the instructions or program code of the image display module 192_4 to display an image on the display 110 and provide the image to the user 150 wearing the HMD apparatus 100.

In an embodiment of the disclosure, the at least one processor 191 may include, but is not limited to, at least one of a CPU, a microprocessor, a graphics processing unit (GPU), application specific integrated circuits (ASICs), an AP, digital signal processors (DSPs), digital signal processing devices (DSPDs), programmable logic devices (PLDs), field programmable gate arrays (FPGAs), a neural processing unit (NPU), or a dedicated artificial intelligence (AI) processor designed with a hardware structure specialized for training and processing AI models.

In an embodiment of the disclosure, the at least one processor 191 may control the at least one eye-tracking light source 130 to emit the light 160 toward the eyes 151 of the user wearing the HMD apparatus 100. In this case, the light emitted from the at least one eye-tracking light source 130 may be an IR ray.

In an embodiment of the disclosure, the at least one processor 191 may control the at least one eye-tracking sensor 140 to receive the reflected light 170 that is light reflected from the eyes 151 of the user wearing the HMD apparatus 100. In this case, the reflected light 170 received via the at least one eye-tracking sensor 140 may be an IR ray.

In an embodiment of the disclosure, the communication interface 194 may perform data communication with an external server according to control by the at least one processor 191. Furthermore, the communication interface 194 may perform data communication with other nearby electronic devices as well as the external server.

In an embodiment of the disclosure, the communication interface 194 may perform data communication with a server or other nearby electronic devices by using at least one of data communication methods including, for example, wired local area network (LAN), wireless LAN, Wi-Fi, Bluetooth, ZigBee, Wi-Fi Direct (WFD), Infrared Data Association (IrDA), Bluetooth Low Energy (BLE), near field communication (NFC), wireless broadband Internet (WiBro), World Interoperability for Microwave Access (WiMAX), Shared Wireless Access Protocol (SWAP), Wireless Gigabit Alliance (WiGig), and radio frequency (RF) communication.

In an embodiment of the disclosure, the communication interface 194 may receive data including an image displayed on the display 110 from a server or other nearby electronic devices. The at least one processor 191 may display an image on the display 110 based on the received data.

Figure 4:
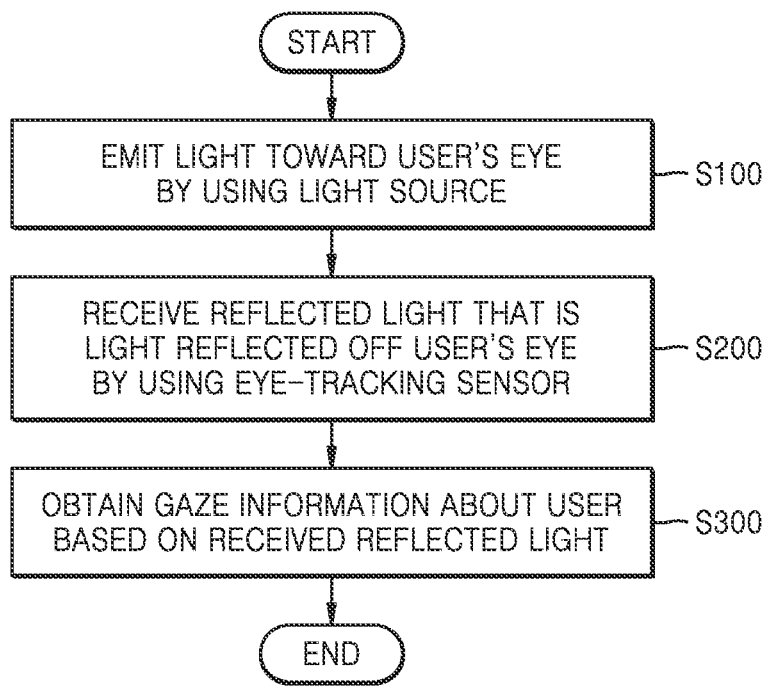
FIG. 4 is a flowchart illustrating operations of an HMD apparatus according to an embodiment of the disclosure.

FIG. 4 is a flowchart illustrating operations of an HMD apparatus according to an embodiment of the disclosure.

Referring to FIGS. 1 and 4, in an embodiment of the disclosure, an operating method of the HMD apparatus 100 may include emitting the light 160 toward the user's eyes 151 by using the at least one eye-tracking light source 130 (S100). In an embodiment of the disclosure, in operation S100 of emitting the light 160 toward the user's eyes 151, the at least one processor (191 of FIG. 3) may emit the light 160 toward the user's eyes 151 via the at least one eye-tracking light source 130.

In an embodiment of the disclosure, the operating method of the HMD apparatus 100 may include receiving the reflected light 170, which is light reflected from the user's eyes 151, by using the at least one eye-tracking sensor 140 (S200). In an embodiment of the disclosure, the at least one eye-tracking sensor 140 may be positioned adjacent to a second side (115 of FIG. 9) that is opposite to a first side (114 of FIG. 9) of the display 110. In an embodiment of the disclosure, in operation S200 of receiving the reflected light 170 that is light reflected from the user's eyes 151, the at least one processor 191 may receive, via the at least one eye-tracking sensor 140, the reflected light 170 obtained when the light emitted from the at least one eye-tracking light source 130 is reflected off the user's eyes 151.

In an embodiment of the disclosure, the operating method of the HMD apparatus 100 may include obtaining gaze information about the user 150 based on the received reflected light 170 (S300). In an embodiment of the disclosure, in operation S300 of obtaining the gaze information about the user 150, the at least one processor 191 may obtain the gaze information including at least one of a direction of a gaze of the user 150, a distance between the user's eyes 151 and the optical lens 120, a point of view where the gaze of the user 150 intersects the optical lens 120, or a point of view where the gaze of the user 150 intersects the display 110. However, the disclosure is not limited thereto, and in operation S300 of obtaining the gaze information about the user 150 based on the received reflected light 170, biometric information of the user 150 may also be obtained. In an embodiment of the disclosure, in operation S300 of obtaining the gaze information or biometric information about the user 150, the at least one processor 191 may obtain iris patterns of the user's eyes 151 or images of eyeballs of the user 150. The HMD apparatus 100 may obtain the biometric information about the user 150, based on the iris patterns of the user's eyes 151 or the images of the i the eyeballs of the user 150. In an embodiment of the disclosure, the biometric information about the user 150 may include an image of an iris of each of the user's eyes 151, an image of a retina of each of the user's eyes 151, vein patterns inside the user's eyes 151, visual acuity of the user's eye 151, information about disease present in the user's eyes 151, etc.

In an embodiment of the disclosure, in operation S300 of obtaining the gaze information or biometric information about the user 150 based on the received reflected light 170, the at least one processor 191 may obtain at least one of the gaze information of the user 150 or biometric information about the user 150 based on the received reflected light 170.

In an embodiment of the disclosure, the operating method of the HMD apparatus 100 may further include displaying an image on the display 110. In the operation of displaying the image on the display 110, at least one of resolution, luminance, or contrast ratio of the image displayed on the display 110 may be determined based on the obtained gaze information about the user 150.

In an embodiment of the disclosure, the operating method of operating the HMD apparatus 100 may further include providing the obtained biometric information about the user 150 to the user 150.

Figure 5:
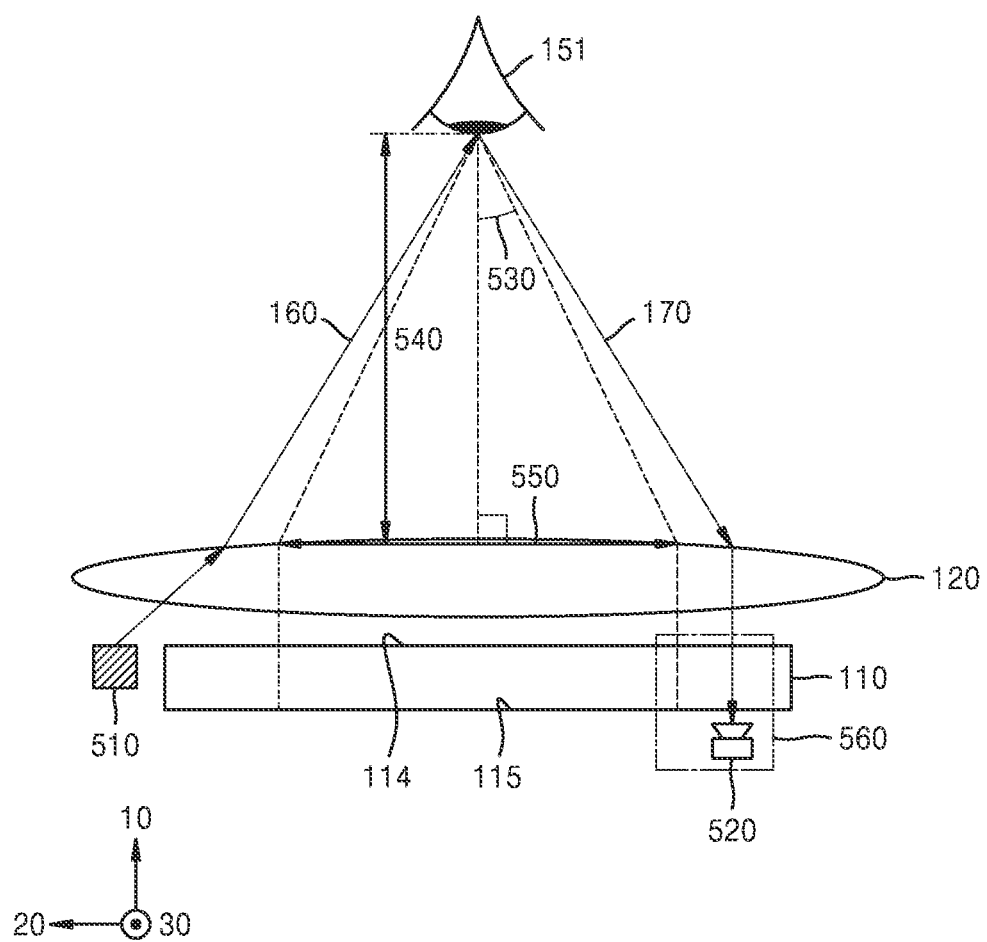
FIG. 5 is a conceptual diagram illustrating that an eye-tracking sensor is disposed within a display region of a display, and an eye-tracking light source is disposed outside the display region of the display, according to an embodiment of the disclosure.

FIG. 5 is a conceptual diagram illustrating that an eye-tracking sensor is disposed within a display region of a display, and an eye-tracking light source is disposed outside the display region of the display, according to an embodiment of the disclosure.

Referring to FIGS. 1 and 5, the user's eyes 151, the display 110, and the optical lens 120 are shown to illustrate the arrangement of at least one eye-tracking light source 510 and at least one eye-tracking sensor 520. Hereinafter, for convenience of descriptions, FIGS. 5 to 12 show the display 110, the optical lens 120, the at least one eye-tracking light source 510, and the at least one eye-tracking sensor 520, each corresponding to one of the two eyes of the user 150. However, the disclosure is not limited thereto, and a display, an optical lens, at least one eye-tracking light source, and at least one eye-tracking sensor, each corresponding to the other eye of the user 150, may have the same shapes and arrangement as shown in FIGS. 5 to 12.

In an embodiment of the disclosure, the optical lens 120 may be disposed on the display 110 with respect to the first direction axis 10. A side of the display 110 adjacent to the user's eyes 151 may be defined as the first side 114, and a side opposite to the first side 114 may be defined as the second side 115. The optical lens 120 may be disposed adjacent to the first side 114 of the display 110. In an embodiment of the disclosure, with respect to the first direction axis 10, a first distance 540 between the optical lens 120 and the user's eyes 151 may be less than a second distance between the display 110 and the user's eyes 151.

In an embodiment of the disclosure, in a plane defined by the second direction axis 20 and the third direction axis 30, a cross-sectional area of the optical lens 120 may be greater than or equal to a cross-sectional area of the display 110. The entire area of the display 110 may overlap with the optical lens 120 with respect to the first direction axis 210. In an embodiment of the disclosure, a cross-sectional area of an aperture stop of the optical lens 120 may be greater than or equal to a cross-sectional area of the display region of the display 110. In an embodiment of the disclosure, the aperture stop of the optical lens 120 may be inscribed in the display region of the display 110.

In an embodiment of the disclosure, a visual field of the user 150 includes central vision and peripheral vision. The 'central vision' may refer to a field of view used when observing an area on which a gaze of the user 150 is focused. The central vision may refer to the field of view used to observe an area disposed in a center of a user's visual field. In an embodiment of the disclosure, the user 150 may use the central vision to observe an image displayed in an area of the display 110 on which the gaze of the user 150 is focused.

'Peripheral vision' may refer to a field of view used when observing an area surrounding the area on which the gaze of the user 150 is focused. The peripheral vision may refer to the field of view used to observe an area adjacent to the center of the user's visual field. In an embodiment of the disclosure, the user 150 may use the peripheral vision to observe an image displayed in an area of the display 110 adjacent to the area on which the gaze of the user 150 is focused.

In this case, the user's visual acuity when observing the image by using the central vision is higher than the user's visual acuity when observing the image by using the peripheral vision. Thus, in order to clearly view an image displayed on the display 110, the user 150 may view the image displayed on the display 110 by changing an area of focus on the display 110.

In an embodiment of the disclosure, an image displayed on the display 110 may be refracted, reflected, or dispersed through the optical lens 120 and then provided to the user 150. A distance between the user's eyes 151 and an area where the image displayed on the display 110 is formed after being refracted, reflected, or dispersed through the optical lens 120 may be less than or equal to the first distance between the optical lens 120 and the user's eyes 151. Hereinafter, for convenience of descriptions, it is described that the distance between the user's eyes 151 and the area where the image refracted, reflected, or dispersed through the optical lens 120 is formed is equal to the first distance.

In an embodiment of the disclosure, the user 150 may recognize the image provided by the HMD apparatus 100 by observing the image refracted, reflected, or dispersed through the optical lens 120.

In an embodiment of the disclosure, the region of interest 550 is an area where the user 150 may observe an image with central vision by moving only the user's eyes 151 without moving the head among areas where an image refracted, reflected, or dispersed through the optical lens 120 is formed.

In an embodiment of the disclosure, the region of interest 550 may be determined based on the first distance 540, which is the distance between the user's eyes 151 and the optical lens 120, and a predetermined reference angle 530.

In an embodiment of the disclosure, the first distance 540 may be determined based on the structure and shape of the HMD apparatus 100 according to the disclosure and physical characteristics such as a skeleton of the user 150. In an embodiment of the disclosure, the first distance 540 may be an average value of a plurality of first distances calculated based on the structure and shape of the HMD apparatus 100 according to the disclosure and different physical characteristics of a plurality of users expected to use the HMD apparatus 100.

In an embodiment of the disclosure, the reference angle 530 may be an angle set to correspond to an angle that is determined, based on human factors, to be a maximum angle at which, when the user 150 who views an image by using the HMD apparatus 100 focuses his or her gaze on an area where an image refracted, reflected, or dispersed through the optical lens 120 is formed, the user 150 moves the user's eyes 151 to change an area of focus without moving the head from the area where the user's gaze is initially focused. In an embodiment of the disclosure, the reference angle 530 may be an angle set based on a center (931 of FIG. 9) of the optical lens 120.

In an embodiment of the disclosure, when the center 931 of the optical lens 120 corresponds to an area of the display 110 on which the user 150 initially focuses the user' gaze, the reference angle 530 may be set to an angle of at least 10° but not more than 40° relative to the center 931 of the optical lens 120. In an embodiment of the disclosure, the reference angle 530 may be set to 30°.

In an embodiment of the disclosure, when the user 150 tries to change an area of focus to another area from an area on which the user's gaze is initially focused in order to observe an image, and an angle between the area on which the user's gaze is initially focused and the other area relative to the user's eyes 151 is less than or equal to the reference angle 530, the user 150 may change the area of focus by moving the user's eyes 151 without moving the head of the user 150.

In an embodiment of the disclosure, when the user 150 tries to change an area of focus to another area from an area on which the user's gaze is initially focused in order to observe an image, and an angle between the area on which the user's gaze is initially focused and the other area relative to the user's eyes 151 is greater than the reference angle 530, the user 150 may change the area of focus by turning the head of the user 150.

In an embodiment of the disclosure, when observing an image corresponding to the region of interest 550, the user 150 may observe the image by moving only the user's eyes 151. In this case, sharpness of an image corresponding to an area other than the region of interest 550 and observed using the peripheral vision of the user 150 may be lower than sharpness of the image corresponding to the region of interest 550.

In an embodiment of the disclosure, when observing an image displayed in an area other than the region of interest 550 within the display 110, the user 150 may observe the image displayed on the display 110 by moving the head or moving the head and the eyes 151 of the user 150.

In this case, because the HMD apparatus 100 of the disclosure is worn on the head of the user 150, the HMD apparatus 100 also moves in response to the user 150 moving his head. Therefore, even when the user 150 moves the head, a center of the optical lens 120 corresponding to the area of the display 110 on which the user 150 initially focuses the user's gaze may be identical to the center 931 of the optical lens 120 before the user 150 moves his or her head. Furthermore, a position of the region of interest 550 included in the display 110 when the user 150 moves his or her head may also be identical to a position of the region of interest 550 included in the display 110 before the user 150 moves his or her head.

In an embodiment of the disclosure, when the at least one processor (191 of FIG. 3) identifies that the head of the user 150 is moving via the eye sensing module 192_3, the at least one processor 191 may change an image displayed on the display 110 in response to the movement of the head of the user 150 so that the user 150 may observe an image displayed in an area other than the region of interest 550 before the user 150 moves his or her head. In detail, when identifying that the head of the user 150 is moving, the at least one processor 191 may change an image displayed in the region of interest 550 in response to the movement of the head of the user 150, thereby reproducing the same effect as observing an image from a wide viewing angle according to movement of the head of the user 150.

In this case, even when the user 150 moves the head, an area other than the region of interest 550 is observed using peripheral vision, so sharpness of an image displayed in the area other than the region of interest 550 as recognized by the user 150 may be low.

In an embodiment of the disclosure, the at least one eye-tracking light source 510 may be disposed outside the first display region 111 and the second display region 112 with respect to the first direction axis 10. The at least one eye-tracking light source 510 may overlap with the optical lens 120 with respect to the first direction axis 10. Light 160 emitted by the at least one eye-tracking light source 510 may be irradiated onto the user's eyes 151 through the optical lens 120. However, the disclosure is not limited thereto. Even when the at least one eye-tracking light source 510 and the optical lens 120 do not overlap with respect to the first direction axis 10, the light 160 provided by the at least one eye-tracking light source 510 may be emitted onto the user's eyes 151 through the optical lens 120.

In an embodiment of the disclosure, the at least one eye-tracking sensor 520 may be disposed inside the second display region 112 with respect to the first direction axis 10. The at least one eye-tracking sensor 520 may be disposed adjacent to the second side 115 of the display 110. With respect to the first direction axis 10, a third distance between the at least one eye-tracking sensor 520 and the user's eyes 151 may be greater than the first distance between the optical lens 120 and the user's eyes 151.

In an embodiment of the disclosure, with respect to the first direction axis 10, the at least one eye-tracking sensor 520 may be disposed outside the region of interest 550. The at least one eye-tracking sensor 520 may overlap with the optical lens 120 with respect to the first direction axis 10. The at least one eye-tracking sensor 520 may receive reflected light 170, which is light reflected from the user's eyes 151, through the optical lens 120. However, the disclosure is not limited thereto. Even when the at least one eye-tracking sensor 520 and the optical lens 120 do not overlap with respect to the first direction axis 10, the at least one eye-tracking sensor 520 may receive the reflected light 170, which is reflected from the user's eyes 151, through the optical lens 120.

When the at least one eye-tracking sensor 520 is not disposed inside the display region with respect to the first direction axis 10 and is spaced apart from the display 110 with respect to at least one of the second direction axis 20 or the third direction axis 30, reflected light reception performance of the at least one eye-tracking sensor 520 may be reduced. In detail, in order to observe an image displayed on the display 110, the user 150 may move the user's eyes 151 in a direction away from a position where the at least one eye-tracking sensor 520 is disposed. In this case, due to a large distance between the user's eyes 151 and the at least one eye-tracking sensor 520 on the plane defined by the second direction axis 20 and the third direction axis 30, the amount of the reflected light 170 from the user's eyes 151, which is received by the at least one eye-tracking sensor 520, may be insufficient, and thus, the light reception performance of the at least one eye-tracking sensor 520 may deteriorate.

On the other hand, when the at least one eye-tracking sensor 520 is disposed inside a second display region (612 of FIG. 6) with respect to the first direction axis 10 as in the HMD apparatus 100 of the disclosure, even though the user 150 moves the user's eyes 151 away from a position where the at least one eye-tracking sensor 520 is disposed in order to observe an image displayed on the display 110, the light reception performance of the at least one eye-tracking sensor 520 may be improved due to a close distance between the user's eyes 151 and the at least one eye-tracking sensor 520 in the plane defined by the second direction axis 20 and the third direction axis 30.

Figure 6:
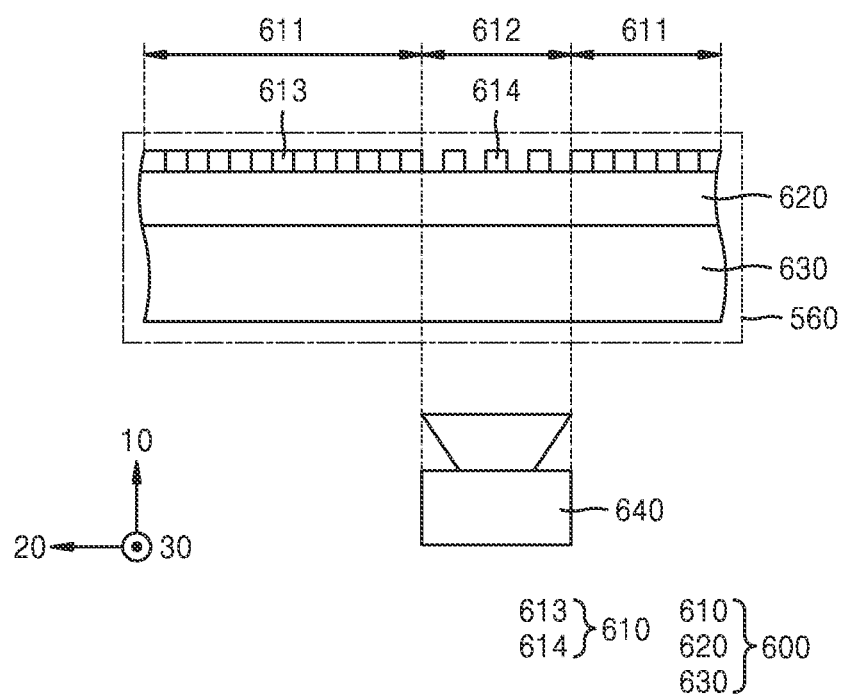
FIG. 6 is an enlarged view illustrating that an eye-tracking sensor is disposed within a display region of a display and an eye-tracking light source is disposed outside the display region of the display, according to an embodiment of the disclosure.

FIG. 6 is an enlarged view illustrating that an eye-tracking sensor is disposed within a display region of a display and an eye-tracking light source is disposed outside the display region of the display, according to an embodiment of the disclosure.

FIG. 6 is an enlarged view of an area 560 shown in FIG. 5.

In an embodiment of the disclosure, a display 600 may include a substrate 630, a circuit layer 620 disposed on the substrate 630, and a plurality of pixels 610 arranged on the circuit layer 620.

In an embodiment of the disclosure, the substrate 630 may be a member that provides a base surface on which the circuit layer 620 is disposed. The substrate 630 may be a stack structure including a plastic substrate, an insulating film, glass, or a plurality of insulating layers.

In an embodiment of the disclosure, the circuit layer 620 may be disposed on the substrate 630. The circuit layer 620 may include an insulating layer, a semiconductor pattern, a conductive pattern, and a signal line. In an embodiment of the disclosure, the circuit layer 620 may include a thin-film transistor and a plurality of insulating layers on the substrate 630. The circuit layer 620 may also include a plurality of connection electrode units formed to penetrate a plurality of insulating layers.

In an embodiment of the disclosure, the plurality of pixels 610 may be disposed on the circuit layer 620. Each of the plurality of pixels 610 may generate light. In an embodiment of the disclosure, each of the plurality of pixels 610 may include an OLED or an inorganic LED that generates light of a different color. However, the disclosure is not limited thereto, and each of the plurality of pixels 610 may include an OLED or an inorganic LED that produces the same color of light, and the display 600 may further include a color filter layer including a plurality of color filters having different colors. In an embodiment of the disclosure, each of the plurality of pixels 610 may include a quantum dot LED (QLED).

In an embodiment of the disclosure, the plurality of pixels 610 may be electrically connected to at least one of the semiconductor pattern, the conductive pattern, or the signal line included in the circuit layer 620.

In an embodiment of the disclosure, each of the plurality of pixels 610 may include an emissive layer for generating light and an electrode layer such as a cathode and an anode for applying a voltage to the emissive layer. A portion of the light irradiated into the plurality of pixels 610 from the outside may be refracted, reflected, etc. by at least one of the emissive layer or the electrode layer included in each of the plurality of pixels 610. Thus, transmittance of an area where the plurality of pixels 610 are arranged may be lower than transmittance of an area where the plurality of pixels 610 are not arranged.

In an embodiment of the disclosure, the display 600 may include a first display region 611 and a second display region 612 for displaying an image. In an embodiment of the disclosure, the plurality of pixels 610 may include a plurality of first pixels 613 included in the first display region 611 and a plurality of second pixels 614 included in the second display region 612.

In an embodiment of the disclosure, a resolution of the first display region 611 may be higher than a resolution of the second display region 612. The number of the plurality of first pixels 613 per unit area of the first display region 611 may be greater than the number of the plurality of second pixels 614 per unit area of the second display region 612. In an embodiment of the disclosure, a size of each of the first pixels 613 may be equal to a size of each of the second pixels 614. In an embodiment of the disclosure, a spacing between adjacent first pixels among the plurality of first pixels 613 may be less than a spacing between adjacent second pixels among the plurality of second pixels 614.

In an embodiment of the disclosure, the transmittance of the second display region 612 with a smaller number of pixels per unit area may be higher than the transmittance of the first display region 611 with a larger number of pixels per unit area.

However, the disclosure is not limited thereto. In an embodiment of the disclosure, the size of each of the plurality of second pixels 614 may be larger than the size of each of the first plurality of pixels 613, and the spacing between adjacent first pixels among the plurality of first pixels 613 may be less than the spacing between adjacent second pixels among the plurality of second pixels 614. Even in this case, in an embodiment of the disclosure, the transmittance of the second display region 612 with a smaller number of pixels per unit area may be higher than the transmittance of the first display region 611 with a larger number of pixels per unit area.

In an embodiment of the disclosure, the first side (114 of FIG. 5) of the display 600 may be a side adjacent to the plurality of pixels 610. The first side 114 of the display 600 may refer to a top surface of the plurality of pixels 610.

In an embodiment of the disclosure, the second side (115 of FIG. 5) of the display 600 may be a side adjacent to the substrate 630. The second side 115 of the display 600 may refer to a bottom surface of the substrate 630.

In an embodiment of the disclosure, the substrate 630 may be disposed above at least one eye-tracking sensor 640. In an embodiment of the disclosure, the at least one eye-tracking sensor 640 may be disposed below the display 600, and may be disposed inside the second display region 612 with respect to the first direction axis 10. In an embodiment of the disclosure, the at least one eye-tracking sensor 640 may be disposed outside the first display region 611 with respect to the first direction axis 10. The first display region 611 does not overlap the at least one eye-tracking sensor 640 with respect to the first direction axis 10. In an embodiment of the disclosure, the at least one eye-tracking sensor 640 may be disposed to overlap with an area of the substrate 630 corresponding to the second display region 612. The at least one eye-tracking sensor 640 may be disposed below the area of the substrate 630 included in the second display region 612.

In an embodiment of the disclosure, the at least one eye-tracking sensor 640 may be disposed inside the second display region 612, which has a relatively high transmittance compared to the first display region 611, to receive the reflected light (170 of FIG. 5) that is light reflected from the user's eyes (151 of FIG. 5).

The HMD apparatus (100 of FIG. 1) of the disclosure may have the at least one eye-tracking sensor 640 arranged to be close to the user's eyes 151 in the plane defined by the second direction axis 20 and the third direction axis 30 and to be included in the second display region 612 having high transmittance in the display 600, thereby improving light reception performance of the at least one eye-tracking sensor 640.

Figure 7:
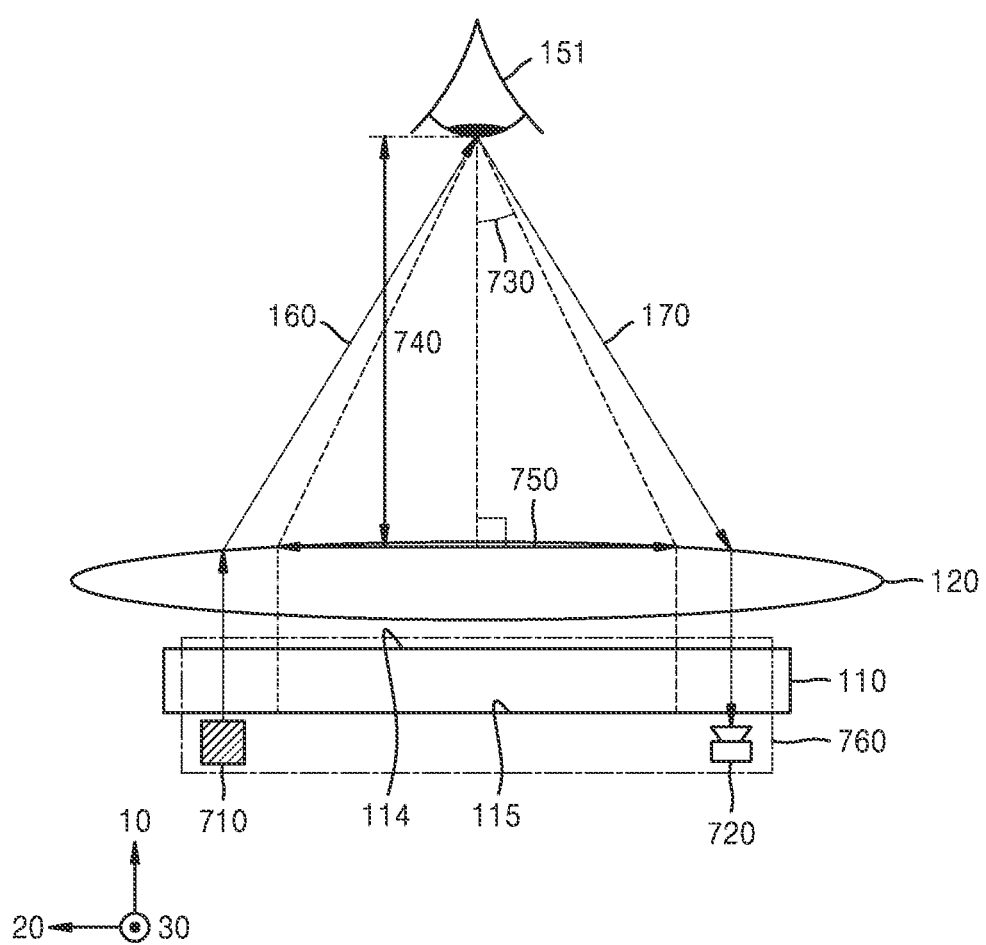
FIG. 7 is a conceptual diagram illustrating that each of an eye-tracking sensor and an eye-tracking light source is disposed inside a display region, according to an embodiment of the disclosure.

FIG. 7 is a conceptual diagram illustrating that each of an eye-tracking sensor and an eye-tracking light source is disposed inside a display region, according to an embodiment of the disclosure. Hereinafter, components identical to those described with reference to FIG. 5 will be assigned the same reference numerals, and descriptions already provided above will be omitted.

Referring to FIGS. 1 and 7, the user's eyes 151, the display 110, and the optical lens 120 are shown to illustrate the arrangement of at least one eye-tracking light source 710 and at least one eye-tracking sensor 720.

In an embodiment of the disclosure, the optical lens 120 may be disposed on the display 110 with respect to the first direction axis 10. The optical lens 120 may be disposed adjacent to the first side 114 of the display 110. In an embodiment of the disclosure, with respect to the first direction axis 10, a first distance 740 between the optical lens 120 and the user's eyes 151 may be less than a second distance between the display 110 and the user's eyes 151.

In an embodiment of the disclosure, in a plane defined by the second direction axis 20 and the third direction axis 30, a cross-sectional area of the optical lens 120 may be greater than or equal to a cross-sectional area of the display 110. A cross-sectional area of an aperture stop of the optical lens 120 may be greater than or equal to a cross-sectional area of the display region of the display 110. With respect to the first direction axis 10, the entire area of the display 110 may overlap with the optical lens 120. The aperture stop of the optical lens 120 may be inscribed in the display region of the display 110.

In an embodiment of the disclosure, a region of interest 750 may be determined based on the first distance 740, which is the distance between the user's eyes 151 and the optical lens 120, and a predetermined reference angle 530.

In an embodiment of the disclosure, the region of interest 750 is an area where the user 150 may observe an image with central vision by moving only the user's eyes 151 without moving the head. In an embodiment of the disclosure, when observing an image corresponding to the region of interest 750, the user 150 may observe the image by moving only the user's eyes 151. In this case, sharpness of an image corresponding to an area other than the region of interest 750 and observed using the peripheral vision of the user 150 may be lower than sharpness of the image corresponding to the region of interest 750.

In an embodiment of the disclosure, the at least one eye-tracking light source 710 may be disposed inside the second display region 112 with respect to the first direction axis 10. The at least one eye-tracking light source 710 may be disposed adjacent to the second side 115 of the display 110. With respect to the first direction axis 10, a fourth distance between the at least one eye-tracking light source 710 and the user's eyes 151 may be greater than the first distance 740 between the optical lens 120 and the user's eyes 151.

The at least one eye-tracking light source 710 may overlap with the optical lens 120 with respect to the first direction axis 10. Light 160 emitted by the at least one eye-tracking light source 710 may pass through the display 110 and be irradiated onto the user's eyes 151 through the optical lens 120. However, the disclosure is not limited thereto. Even when the at least one eye-tracking light source 710 and the optical lens 120 do not overlap with respect to the first direction axis 10, the light 160 provided by the at least one eye-tracking light source 710 may be emitted onto the user's eyes 151 through the optical lens 120.

In an embodiment of the disclosure, the at least one eye-tracking light source 710 may be disposed outside the region of interest 750 with respect to the first direction axis 10.

In an embodiment of the disclosure, the at least one eye-tracking sensor 720 may be disposed inside the second display region 112 with respect to the first direction axis 10. The at least one eye-tracking sensor 720 may be disposed adjacent to the second side 115 of the display 110.

In an embodiment of the disclosure, with respect to the first direction axis 10, the at least one eye-tracking sensor 720 may be disposed outside the region of interest 750. The at least one eye-tracking sensor 520 may overlap with the optical lens 120 with respect to the first direction axis 10.

The at least one eye-tracking sensor 720 may receive reflected light 170, which is light reflected from the user's eyes 151, through the optical lens 120. However, the disclosure is not limited thereto. Even when the at least one eye-tracking sensor 720 and the optical lens 120 do not overlap with respect to the first direction axis 10, the at least one eye-tracking sensor 720 may receive the reflected light 170, which is reflected from the user's eyes 151, through the optical lens 120.

Figure 8:
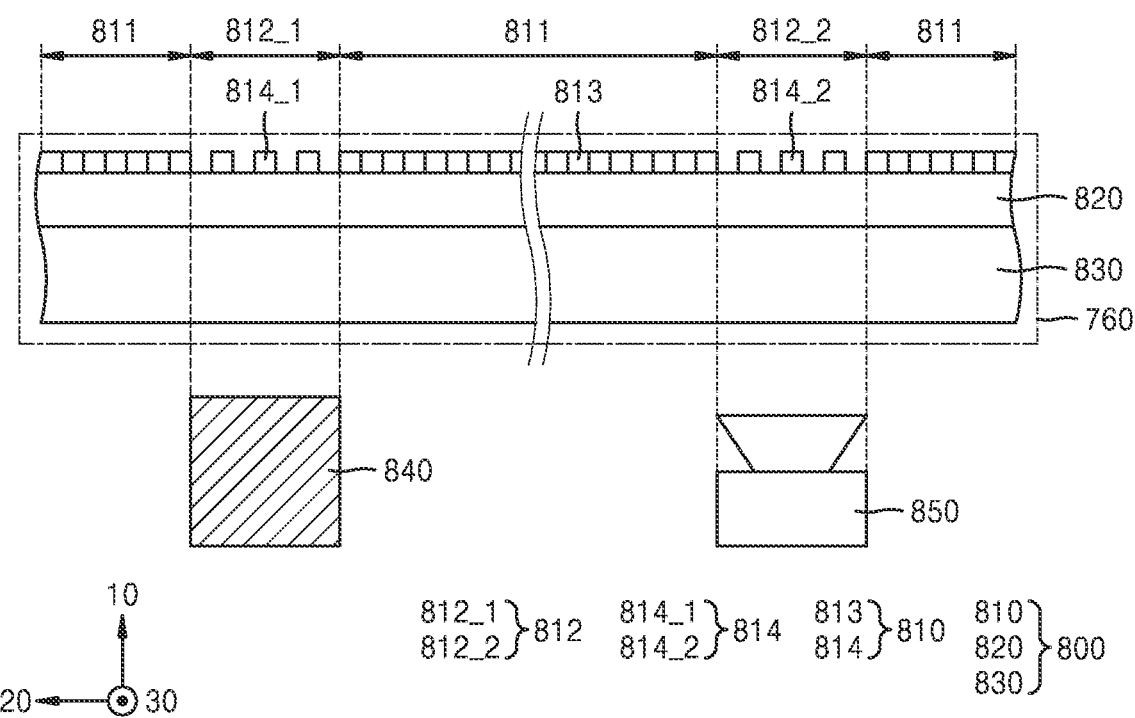
FIG. 8 is an enlarged view illustrating that each of an eye-tracking sensor and an eye-tracking light source is disposed inside a display region, according to an embodiment of the disclosure.

FIG. 8 is an enlarged view illustrating that each of an eye-tracking sensor and an eye-tracking light source overlaps with a display region, according to an embodiment of the disclosure. Hereinafter, components identical to those described with reference to FIG. 6 will be assigned the same reference numerals, and descriptions already provided above will be omitted.

Referring to FIGS. 7 and 8, FIG. 8 is an enlarged view of an area 760 shown in FIG. 7. In an embodiment of the disclosure, a display 800 may include a substrate 830, a circuit layer 820 disposed on the substrate 630, and a plurality of pixels 810 arranged on the circuit layer 820.

In an embodiment of the disclosure, the display 800 may include a first display region 811 and a second display region 812 for displaying an image. In an embodiment of the disclosure, the plurality of pixels 810 may include a plurality of first pixels 813 included in the first display region 811 and a plurality of second pixels 814 included in the second display region 812.

In an embodiment of the disclosure, a resolution of the first display region 811 may be higher than a resolution of the second display region 812. The number of the plurality of first pixels 813 per unit area of the first display region 811 may be greater than the number of the plurality of second pixels 814 per unit area of the second display region 812. In an embodiment of the disclosure, transmittance of the second display region 812 with a smaller number of pixels per unit area may be higher than transmittance of the first display region 811 with a larger number of pixels per unit area.

In an embodiment of the disclosure, the second display region 812 may include a first sub-display region 812_1 overlapping at least one eye-tracking light source 840 with respect to the first direction axis and a second sub-display region 812_2 overlapping the at least one eye-tracking sensor 850 with respect thereto.

In an embodiment of the disclosure, the at least one eye-tracking light source 840 may be disposed below the display 800, and may be disposed inside the first sub-display region 812_1 with respect to the first direction axis 10. The at least one eye-tracking light source 840 may be disposed outside the first display region 811 with respect to the first direction axis 10. The at least one eye-tracking light source 840 may be disposed below an area of the substrate 830 included in the first sub-display region 812_1.

In an embodiment of the disclosure, the at least one eye-tracking light source 840 may be disposed inside the first sub-display region 812_1, which has a relatively high transmittance compared to the first display region 811, to emit the light 160 toward the user's eyes 151. The number of a plurality of second pixels 814_1 per unit area of the first sub-display region 812_1 may be less than the number of the plurality of first pixels 813 per unit area of the first display region 811 adjacent to the first sub-display area 812_1. Thus, emission performance of the at least one eye-tracking light source 840 that provides the light 160 toward the user's eyes 151 through the first sub-display region 812_1 may be improved.

In an embodiment of the disclosure, the at least one eye-tracking sensor 850 may be disposed below the display 800, and may be disposed inside the second sub-display region 812_2 with respect to the first direction axis 10. The at least one eye-tracking sensor 850 may be disposed outside the first display region 811 with respect to the first direction axis 10. The at least one eye-tracking light source 850 may be disposed below an area of the substrate 830 included in the second sub-display region 812_2.

In an embodiment of the disclosure, the at least one eye-tracking sensor 850 may be disposed inside the second sub-display region 812_2, which has a relatively high transmittance compared to the first display region 811, to receive the reflected light 170 that is light reflected from the user's eyes 151. The number of a plurality of second pixels 814_2 per unit area of the second sub-display region 812_2 may be made smaller than the number of the plurality of first pixels 813 per unit area of the first display region 811 adjacent to the second sub-display region 812_2, so that the light reception performance of the at least one eye-tracking sensor 850 that receives the reflected light 170 through the second sub-display region 812_2 may be improved.

Referring to FIG. 8, the first sub-display region 812_1 and the second sub-display region 812_2 are spaced apart from each other. The first sub-display region 812_1 and the second sub-display region 812_2 may each be surrounded by the first display region 811. The first sub-display region 812_1 and the second sub-display region 812_2 may be included in the display 110 while being spaced apart from each other in the plane defined by the second direction axis 20 and the third direction axis 30. However, the disclosure is not limited thereto, and the first sub-display region 812_1 and the second sub-display region 812_2 may contact each other and be integrated in the display 110 as a single region.

The plurality of second pixels 814 may include the plurality of first sub-pixels 814_1 included in the first sub-display region 812_1 and the plurality of second sub-pixels 814_2 included in the second sub-display region 812_2. Referring to FIG. 8, the number of the plurality of first sub-pixels 814_1 per unit area is equal to the number of the plurality of second sub-pixels 814_2 per unit area. However, the disclosure is not limited thereto, and the number of the first sub-pixels 814_1 per unit area may be different from the number of the second sub-pixels 814_2 per unit area.

Figure 9:
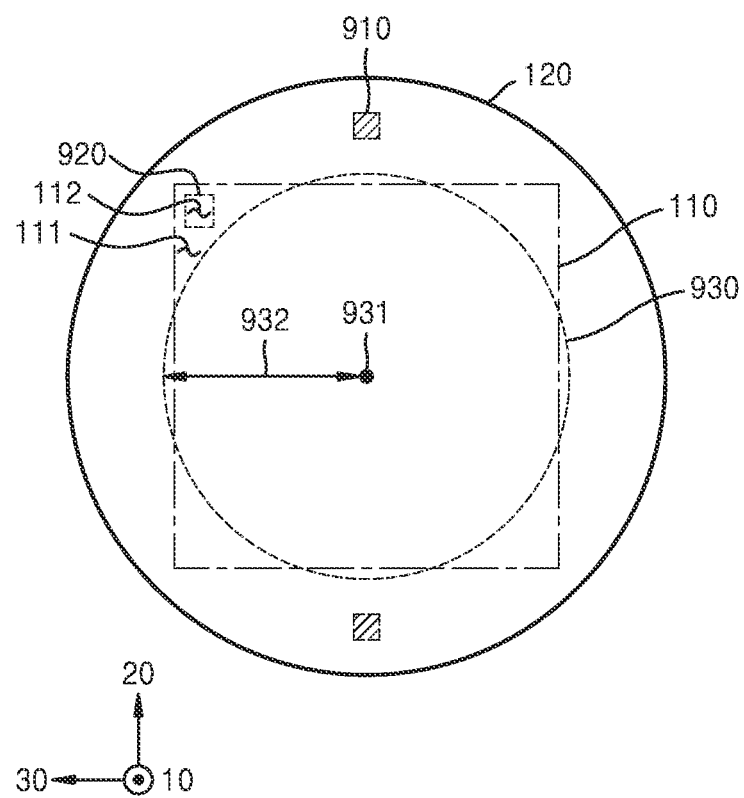
FIG. 9 is a plan view illustrating the arrangement of an eye-tracking sensor and an eye-tracking light source, according to an embodiment of the disclosure.

FIG. 9 is a plan view illustrating the arrangement of an eye-tracking sensor and an eye-tracking light source, according to an embodiment of the disclosure. Hereinafter, components identical to those described with reference to FIGS. 5 to 8 will be assigned the same reference numerals, and descriptions already provided above will be omitted.

FIG. 9 shows the display 110, the optical lens 120, at least one eye-tracking light source 910, and at least one eye-tracking sensor 920 as viewed from the first direction axis 10.

In an embodiment of the disclosure, the optical lens 120 may be disposed on the display 110 with respect to the first direction axis 10. In an embodiment of the disclosure, the optical lens 120 may have a circular shape in the plane defined by the second direction axis 20 and the third direction axis 30. In an embodiment of the disclosure, the display 110 may have a rectangular shape in the plane defined by the second direction axis 20 and the third direction axis 30.

In an embodiment of the disclosure, an entire cross-section of the display 110 in the plane defined by the second direction axis 20 and the third direction axis 30 may overlap with a cross-section of the optical lens 120 in the plane defined by the second direction axis 20 and the third direction axis 30. In an embodiment of the disclosure, a cross-sectional area of the display 110 in the plane defined by the second direction axis 20 and the third direction axis 30 may be smaller than a cross-sectional area of the optical lens 120 in the plane defined by the second direction axis 20 and the third direction axis 30. A cross-sectional area of first and second display regions 111 and 112 of the display 110 in the plane defined by the second direction axis 20 and the third direction axis 30 may be smaller than a cross-sectional area of an aperture stop of the optical lens 120. The aperture stop aperture stop of the optical lens 120 in the plane defined by the second direction axis 20 and the third direction axis 30 may be inscribed in the first and second display regions 111 and 112 of the display 110.

In an embodiment of the disclosure, the display 110 may include the first display region 111 and the second display region 112. The first display region 111 may correspond to a central portion of the display 110. The second display region 112 may be adjacent to the first display region 111. In an embodiment of the disclosure, the second display region 112 may be surrounded by the first display region 111. However, the disclosure is not limited thereto, and some of the boundaries of the second display region 112 may contact the first display region 111, and the remaining boundaries of the second display region 112 may not contact the first display region 111.

In an embodiment of the disclosure, the at least one eye-tracking light source 910 may be disposed below the optical lens 120 and overlap with the optical lens 120 with respect to the first direction axis 10. The at least one eye-tracking light source 910 may not overlap with the display 110 with respect to the first direction axis 10. The at least one eye-tracking light source 910 may be disposed outside the first display region 111 and the second display region 112. However, the disclosure is not limited thereto, and when the display 110 includes a non-display region (e.g., a bezel) in which an image is not displayed, the at least one eye-tracking light source 910 may be disposed outside the first display region 111 and the second display region 112, and may also be disposed inside the non-display region.

In an embodiment of the disclosure, the at least one eye-tracking sensor 920 may be disposed below the display 110, and may be disposed inside the second display region 112 of the display 110 with respect to the first direction axis 10. In an embodiment of the disclosure, the at least one eye-tracking sensor 920 may be disposed outside the first display region 111 of the display 110.

Referring to FIGS. 5 and 9, a region of interest 930 having a reference radius 932 may be defined based on the center 931 the optical lens 120. The reference radius 932 may be set based on the predetermined reference angle 530 and the first distance 540. In an embodiment of the disclosure, the region of interest 930 may be an area where an image displayed on the display 110 is formed after refraction, reflection, or dispersion through the optical lens 120. The user 150 may recognize the image provided via the HMD apparatus 100 based on the image formed in the region of interest 930. In an embodiment of the disclosure, the at least one processor (191 of FIG. 3) may identify a point of view where the gaze of the user 150 intersects the region of interest 930, and control an image displayed on the display 110 and an operation of the HMD apparatus 100 based on the identified point of view. Although FIG. 5 shows a distance between the human eyes 151 and the region of interest 550 is equal to the first distance 540 between the user's eyes 151 and the optical lens 120, the disclosure is not limited thereto. Based on the shape, configuration, and refractive index of the optical lens 120, the distance between the user's eyes 151 and the region of interest 550 may be less than the first distance 540 between the user's eyes 151 and the optical lens 120.

In an embodiment of the disclosure, a region of interest 930 in the plane defined by the second direction axis 20 and the third direction axis 30 may be different from the cross section of the display 110 defined by the second direction axis 20 and the third direction axis 30.

In an embodiment of the disclosure, the user 150 may move his or her eyes to view an image displayed in an area corresponding to the region of interest 930 by using central vision having relatively high visual acuity compared to peripheral vision. Thus, the image displayed in the area corresponding to the region of interest 930 may be clearly viewed by the user 150.

On the other hand, the user 150 may view an image displayed in an area other than an area corresponding to the region of interest 930 by using peripheral vision having relatively low visual acuity compared to central vision. Thus, the image displayed in the area other than the area corresponding to the region of interest 930 may appear blurry to the user 150.

In an embodiment of the disclosure, the first display region 111 may correspond to the region of interest 930. The first display region 111 may overlap with the region of interest 930 with respect to the first direction axis 10. A portion of the first display region 111 may overlap with the region of interest 930, and a portion of the first display region 111 may not overlap with the region of interest 930.

In an embodiment of the disclosure, the second display region 112 may be disposed outside the region of interest 930. The second display region 112 may not overlap with the region of interest 930 with respect to the first direction axis 10. Because an image displayed in the second display region 112 is an image displayed in an area of the display 110 other than the area corresponding to the area of interest 930, the image may appear blurry to the user 150. Therefore, even when a resolution of the second display region 112 is lower than a resolution of the first display region 111, it is possible to prevent the user 150 from perceiving a difference between quality of the image displayed in the second display region 112 and quality of an image displayed in the first display region 111.

Accordingly, the HMD apparatus 100 of the disclosure may have the at least one eye-tracking sensor 920 disposed to be close to the user's eyes 151 in the plane defined by the second direction axis 20 and the third direction axis 30 and to be included in the second display region 112 having high transmittance in the display 110, thereby improving light reception performance of the at least one eye-tracking sensor 920 while preventing the user 150 from perceiving a difference in image quality due to the second display region 112.

Figure 10:
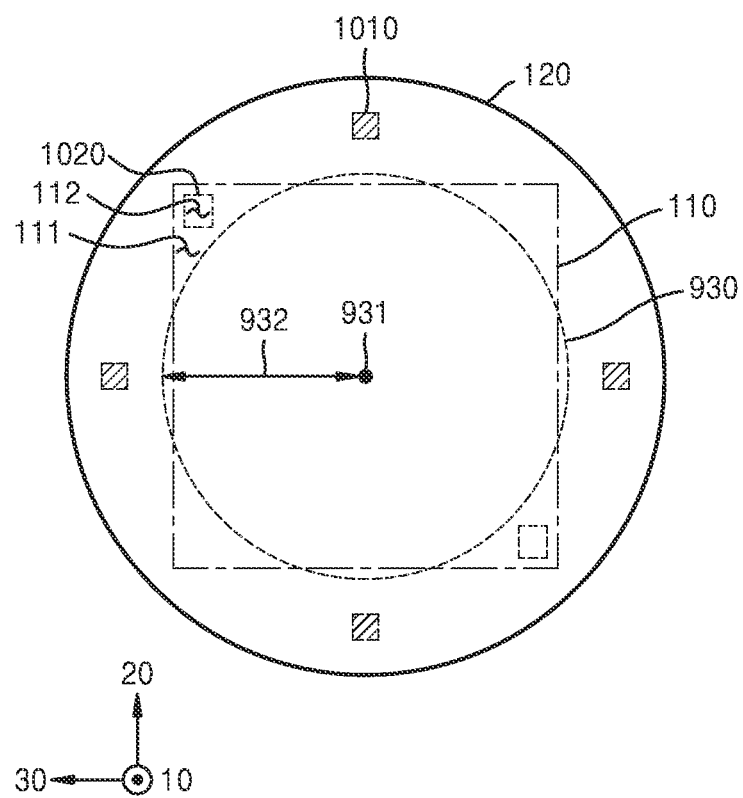
FIG. 10 is a plan view illustrating the arrangement of an eye-tracking sensor and an eye-tracking light source, according to an embodiment of the disclosure.

FIG. 10 is a plan view illustrating the arrangement of an eye-tracking sensor and an eye-tracking light source, according to an embodiment of the disclosure. Hereinafter, components identical to those described with reference to FIG. 9 will be assigned the same reference numerals, and descriptions already provided above will be omitted.

FIG. 10 shows the display 110, the optical lens 120, at least one eye-tracking light source 1010, and at least one eye-tracking sensor 1020 as viewed from the first direction axis 10.

In an embodiment of the disclosure, the optical lens 120 may be disposed on the display 110 with respect to the first direction axis 10. In an embodiment of the disclosure, the optical lens 120 may have a circular shape in the plane defined by the second direction axis 20 and the third direction axis 30. In an embodiment of the disclosure, the display 110 may have a rectangular shape in the plane defined by the second direction axis 20 and the third direction axis 30.

In an embodiment of the disclosure, the at least one eye-tracking light source 1010 may be disposed below the optical lens 120 and overlap with the optical lens 120 with respect to the first direction axis 10. The at least one eye-tracking light source 1010 may be disposed outside the first display region 111 and the second display region 112.

Although FIG. 10 shows that the HMD apparatus (100 of FIG. 1) includes four eye-tracking light sources 1010, the disclosure is not limited thereto. The HMD apparatus 100 may include three or fewer eye-tracking light sources, or five or more eye-tracking light sources. In addition, although FIG. 10 shows the four eye-tracking light sources 1010 are spaced apart from one another on top, bottom, left, and right sides of the optical lens 120, the disclosure is not limited thereto. The arrangement of the at least one eye-tracking light source 1010 included in the HMD apparatus 100 may vary depending on a pattern of reflected light from the user's eye (151 of FIG. 1), which is to be measured.

In an embodiment of the disclosure, the at least one eye-tracking sensor 1020 may be disposed below the display 110, and may be disposed inside the second display region 112 of the display 110 with respect to the first direction axis 10. In an embodiment of the disclosure, the at least one eye-tracking sensor 1020 may be disposed outside the first display region 111 of the display 110. In an embodiment of the disclosure, the at least one eye-tracking sensor 1020 may be disposed outside the region of interest 930.

In an embodiment of the disclosure, FIG. 10 shows that the HMD apparatus 100 includes the two eye-tracking sensors 1020. The two eye-tracking sensors 1020 may each be disposed inside the second display region 112. However, the disclosure is not limited thereto. The HMD apparatus 100 may include one eye-tracking sensor or three or more eye-tracking sensors. In addition, although FIG. 10 shows the two eye-tracking sensors 1020 are spaced apart from each other, the disclosure is not limited thereto. Two or more eye-tracking sensors included in the HMD apparatus 100 may be arranged adjacent to each other and overlap with a common second display region.

Figure 11:
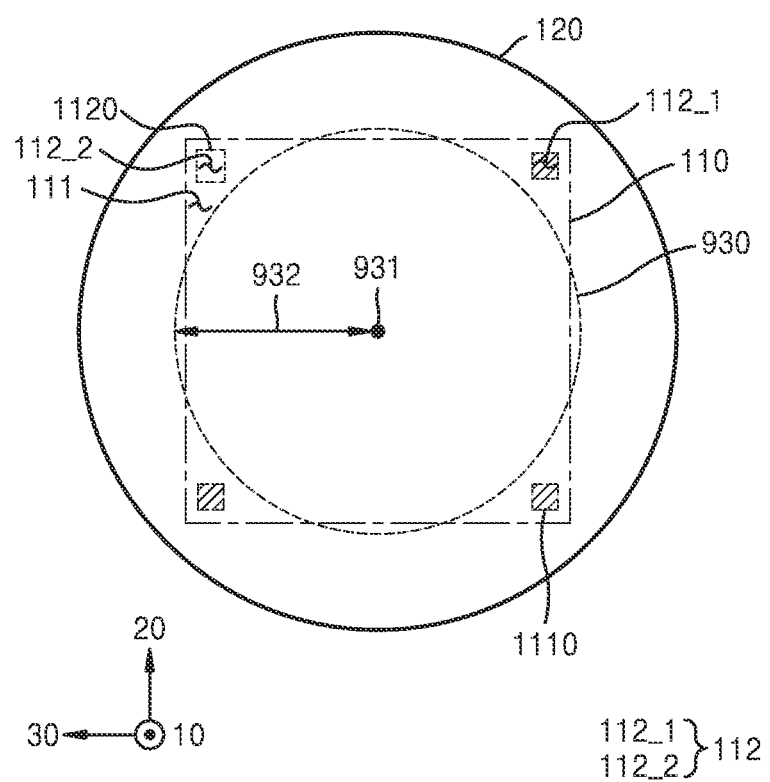
FIG. 11 is a plan view illustrating the arrangement of an eye-tracking sensor and an eye-tracking light source, according to an embodiment of the disclosure.

FIG. 11 is a plan view illustrating the arrangement of an eye-tracking sensor and an eye-tracking light source, according to an embodiment of the disclosure. Hereinafter, components identical to those described with reference to FIGS. 9 and 10 will be assigned the same reference numerals, and descriptions already provided above will be omitted.

FIG. 9 shows the display 110, the optical lens 120, at least one eye-tracking light source 1110, and at least one eye-tracking sensor 1120 as viewed from the first direction axis 10.

In an embodiment of the disclosure, the optical lens 120 may be disposed on the display 110 with respect to the first direction axis 10. In an embodiment of the disclosure, the optical lens 120 may have a circular shape in the plane defined by the second direction axis 20 and the third direction axis 30. In an embodiment of the disclosure, the display 110 may have a rectangular shape in the plane defined by the second direction axis 20 and the third direction axis 30.

In an embodiment of the disclosure, the at least one eye-tracking light source 1110 may be disposed below the display 110, so it may be disposed inside the second display region 112 of the display 110 with respect to the first direction axis 10. The at least one eye-tracking light source 1110 may be disposed outside the first display region 111 of the display 110. In an embodiment of the disclosure, the at least one eye-tracking light source 1110 may be disposed outside the region of interest 930. The at least one eye-tracking light source 1110 may overlap with the optical lens 120 with respect to the first direction axis 10.

FIG. 11 shows that the HMD apparatus 100 includes three eye-tracking light sources 1110. The second display region 112 may include three first sub-display regions 112_1 respectively overlapping the three eye-tracking light sources 1110. Although FIG. 11 shows that the three eye-tracking light sources 1110 and the three first sub-display regions 112_1 are arranged to be spaced apart from one another, the disclosure is not limited thereto. The three eye-tracking light sources 1110 may be arranged adjacent to each other, and may be disposed within one common first sub-display region 112.

In an embodiment of the disclosure, the at least one eye-tracking sensor 1120 may be disposed below the display 110, so it may be disposed inside the second display region 112 of the display 110 with respect to the first direction axis 10. The at least one eye-tracking sensor 1120 may be disposed outside the region of interest 930.

FIG. 11 shows the HMD apparatus includes one eye-tracking sensor 1120. The second display region 112 may include one second sub-display region 112_2 overlapping one eye-tracking sensor 1120. Although FIG. 11 shows that the one eye-tracking sensor 1120 and the three eye-tracking light sources 1110 are spaced apart from one another, the disclosure is not limited thereto. The one eye-tracking sensor 1120 and the three eye-tracking light sources 1110 may be arranged adjacent to each other, and may be disposed inside one common second display region 112.

Figure 12:
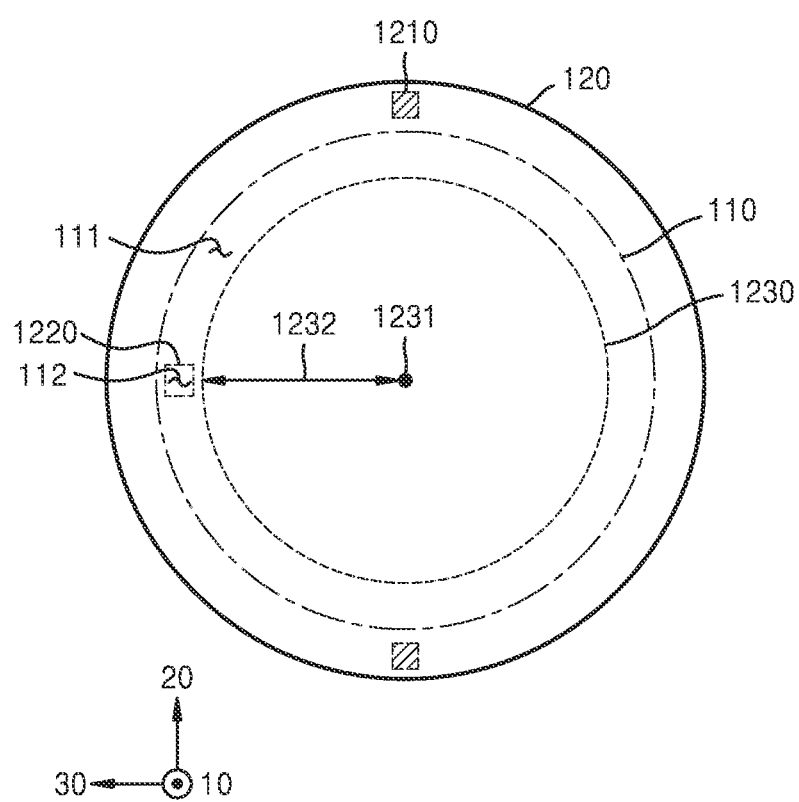
FIG. 12 is a plan view illustrating the arrangement of an eye-tracking sensor and an eye-tracking light source, according to an embodiment of the disclosure.

FIG. 12 is a plan view illustrating the arrangement of an eye-tracking sensor and an eye-tracking light source, according to an embodiment of the disclosure. Hereinafter, components identical to those described with reference to FIGS. 9 to 11 will be assigned the same reference numerals, and descriptions already provided above will be omitted.

FIG. 12 shows the display 110, the optical lens 120, at least one eye-tracking light source 1210, and at least one eye-tracking sensor 1220 as viewed from the first direction axis 10.

In an embodiment of the disclosure, the optical lens 120 may be disposed on the display 110 with respect to the first direction axis 10. In an embodiment of the disclosure, the optical lens 120 may have a circular shape in the plane defined by the second direction axis 20 and the third direction axis 30. In an embodiment of the disclosure, the display 110 may have a circular shape in the plane defined by the second direction axis 20 and the third direction axis 30. However, the disclosure is not limited thereto, and the optical lens 120 and the display 110 may have other shapes, such as a quadrilateral shape.

In an embodiment of the disclosure, the at least one eye-tracking light source 1210 may be disposed below the optical lens 120 and overlap with the optical lens 120 with respect to the first direction axis 10. The at least one eye-tracking light source 1210 may be disposed outside the first display region 111 and the second display region 112 with respect to the first direction axis 10.

In an embodiment of the disclosure, the at least one eye-tracking sensor 1220 may be disposed below the display 110, and may be disposed inside the second display region 112 of the display 110 with respect to the first direction axis 10. In an embodiment of the disclosure, the at least one eye-tracking sensor 1220 may be disposed outside the first display region 111 of the display 110. In an embodiment of the disclosure, the at least one eye-tracking sensor 1220 may be disposed outside the region of interest 1230 having a reference radius 1232 based on a center 1231 of the optical lens 120.

To solve the above-described problems, according to an embodiment of the disclosure, there is provided an HMD apparatus including a display and an optical lens disposed adjacent to a first side of the display. The HMD apparatus may include at least one light source. The HMD apparatus may include at least one eye-tracking sensor disposed adjacent to a second side of the display and configured to obtain gaze information about a user by receiving reflected light obtained when light emitted from the at least one light source is reflected off a user's eyes. The display may include a second display region corresponding to a position where the at least one eye-tracking sensor is disposed, and a first display region other than the second display region. A number of pixels per unit area of the first display region may be greater than a number of pixels per unit area of the second display region.

In an embodiment of the disclosure, the first display region may correspond to a region of interest that is a region having a reference radius corresponding to a reference angle, which is predetermined based on a center of the optical lens, and a distance between the user's eyes and the optical lens. The second display region may be adjacent to the first display region and may be disposed outside the region of interest.

In an embodiment of the disclosure, the predetermined reference angle may be set to an angle of at least 10° but not more than 40°.

In an embodiment of the disclosure, a cross-sectional area of the display may be smaller than a cross-sectional area of the optical lens. In an embodiment of the disclosure, a cross-sectional area of an aperture stop of the optical lens may be greater than or equal to a cross-sectional area of a display region of the display. In an embodiment of the disclosure, the aperture stop of the optical lens may be inscribed in the display region of the display.

In an embodiment of the disclosure, the at least one eye-tracking sensor may obtain biometric information about the user by receiving the reflected light obtained when the light emitted from the at least one light source is reflected off the user's eyes.

In an embodiment of the disclosure, the display may include a substrate, a circuit layer disposed on the substrate, and a plurality of pixels disposed on the circuit layer, wherein the first side of the display is a side adjacent to the plurality of pixels, and the second side of the display is a side adjacent to the substrate.

In an embodiment of the disclosure, the substrate may be disposed above the at least one eye-tracking sensor, and the at least one eye-tracking sensor may be disposed to overlap with an area of the substrate corresponding to an outside of the first display region.

In an embodiment of the disclosure, the second display region may include a first sub-display region where the at least one eye-tracking sensor is disposed and a second sub-display region where the at least one light source is disposed.

In an embodiment of the disclosure, a first distance between the user's eyes and the optical lens may be less than a second distance between the user's eyes and the display.

In an embodiment of the disclosure, the display may include a first display corresponding to a user's left eye and a second display corresponding to a user's right eye. The optical lens may include a first optical lens corresponding to the first display and a second optical lens corresponding to the second display. The at least one eye-tracking sensor may include at least one first eye-tracking sensor corresponding to the first display and at least one second eye-tracking sensor corresponding to the second display.

In an embodiment of the disclosure, the at least one light source may include at least one first eye-tracking light source corresponding to the first display and at least one second eye-tracking light source corresponding to the second display.

In an embodiment of the disclosure, transmittance of the second display region may be greater than transmittance of the first display region.

In an embodiment of the disclosure, each of the plurality of pixels may include an OLED.

To solve the above-described problems, according to an embodiment of the disclosure, there is also provided an HMD apparatus including a display and an optical lens disposed adjacent to a first side of the display. The HMD apparatus may include at least one light source. The HMD apparatus may include at least one eye-tracking sensor disposed adjacent to a second side of the display and configured to receive reflected light obtained when light emitted from the at least one light source is reflected off a user's eyes. The HMD apparatus may include a memory storing at least one instruction and at least one processor configured to execute the at least one instruction stored in the memory. The at least one processor may be configured to obtain gaze information about the user based on the reflected light received by the at least one eye-tracking sensor. The display may include a second display region corresponding to a position where the at least one eye-tracking sensor is disposed, and a first display region other than the second display region. A number of pixels per unit area of the first display region may be greater than a number of pixels per unit area of the second display region.

In an embodiment of the disclosure, the first display region may correspond to a region of interest that is a region having a reference radius corresponding to a reference angle, which is predetermined based on a center of the optical lens, and a distance between the user's eyes and the optical lens, and the second display region may be adjacent to the first display region and may be disposed outside the region of interest. The predetermined reference angle may be set to an angle of at least 10° but not more than 40°.

In an embodiment of the disclosure, the display may include a first display corresponding to a user's left eye and a second display corresponding to a user's right eye. The optical lens may include a first optical lens corresponding to the first display and a second optical lens corresponding to the second display. The at least one eye-tracking sensor may include at least one first eye-tracking sensor corresponding to the first display and at least one second eye-tracking sensor corresponding to the second display. The at least one light source may include at least one first eye-tracking light source corresponding to the first display and at least one second eye-tracking light source corresponding to the second display.

To solve the above-described problems, according to an embodiment of the disclosure, there is also provided an operating method of an HMD apparatus including a display and an optical lens disposed adjacent to a first side of the display. The operating method of the HMD apparatus may include emitting light toward a user's eyes by using at least one light source. The operating method of the HMD apparatus may include receiving reflected light, which is obtained when the light is emitted from the at least one light source and reflected off the user's eyes, by using at least one eye-tracking sensor disposed adjacent to a second side of the display. The operating method of the HMD apparatus may include obtaining gaze information about the user based on the received reflected light. The display may include a second display region corresponding to a position where the at least one eye-tracking sensor is disposed, and a first display region other than the second display region. A number of pixels per unit area of the first display region may be greater than a number of pixels per unit area of the second display region.

In an embodiment of the disclosure, the first display region may correspond to a region of interest that is a region having a reference radius corresponding to a reference angle, which is predetermined based on a center of the optical lens, and a distance between the user's eyes and the optical lens, and the second display region may be adjacent to the first display region and may be disposed outside the region of interest. The predetermined reference angle may be set to an angle of at least 10° but not more than 40°.

In an embodiment of the disclosure, the display may include a first display corresponding to a user's left eye and a second display corresponding to a user's right eye. The optical lens may include a first optical lens corresponding to the first display and a second optical lens corresponding to the second display. The at least one eye-tracking sensor may include at least one first eye-tracking sensor corresponding to the first display and at least one second eye-tracking sensor corresponding to the second display. The at least one light source may include at least one first eye-tracking light source corresponding to the first display and at least one second eye-tracking light source corresponding to the second display.

In an embodiment of the disclosure, there is provided a computer-readable recording medium having recorded thereon a program for performing, on a computer, at least one of the operating methods of the HMD apparatus 100 according to the embodiments of the disclosure.

A program executed by the HMD apparatus 100 described in this specification may be implemented as a hardware component, a software component, and/or a combination of the hardware component and the software component. A program may be executed by any system capable of executing computer-readable instructions.

Software may include a computer program, a piece of code, an instruction, or a combination of one or more thereof, and configure a processing device to operate as desired or instruct the processing device independently or collectively.

The software may be implemented as a computer program including instructions stored in computer-readable storage media. Examples of the computer-readable recording media include magnetic storage media (e.g., ROM, RAM, floppy disks, hard disks, etc.), optical recording media (e.g., compact disc (CD)-ROM, a digital versatile disc (DVD), etc.), etc. The computer-readable recording media may be distributed over computer systems connected through a network so that computer-readable code may be stored and executed in a distributed manner. The recording media may be read by a computer, stored in a memory, and executed by a processor.

A computer-readable storage medium may be provided in the form of a non-transitory storage medium. In this regard, the term 'non-transitory' only means that the storage medium does not include a signal (e.g., an electromagnetic wave) and is a tangible device, and the term does not differentiate between where data is semi-permanently stored in the storage medium and where the data is temporarily stored in the storage medium. For example, the 'non-transitory storage medium' may include a buffer in which data is temporarily stored.

Furthermore, programs according to embodiments of the disclosure set forth in the present specification may be included in a computer program product when provided. The computer program product may be traded, as a product, between a seller and a buyer.

The computer program product may include a software program and a computer-readable storage medium having stored thereon the software program. For example, the computer program product may include a product (e.g., a downloadable application) in the form of a software program electronically distributed by a manufacturer of the HMD apparatus 100 or through an electronic market (e.g., Samsung Galaxy Store™). For such electronic distribution, at least a part of the software program may be stored in the storage medium or may be temporarily generated. In this case, the storage medium may be a storage medium of a server of a manufacturer of the HMD apparatus 100, a server of the electronic market, or a relay server for temporarily storing the software program.

While certain example embodiments the disclosure have been particularly shown and described, it will be understood that various changes in form and details may be made therein without departing from the spirit and scope of the following claims.

What is claimed is:

1. A head mounted display (HMD) apparatus comprising:
a display;
an optical lens adjacent to a first side of the display;
at least one light source configured to emit light; and
at least one eye-tracking sensor adjacent to a second side of the display and configured to obtain gaze information about a user by receiving reflected light, the reflected light being at least a portion of the light emitted from the at least one light source and reflected from an eye of the user,
wherein the display comprises a second display region corresponding to a position of the at least one eye-tracking sensor, and a first display region other than the second display region, and
wherein the first display region comprises first pixels and the second display region comprises second pixels,
wherein a spacing between two adjacent pixels of the first pixels is less than a spacing between two adjacent pixels of the second pixels,
wherein the first display region corresponds to a region of interest that has a reference radius corresponding to a reference angle, which is predetermined based on a center of the optical lens, and a distance between the eye of the user and the optical lens, and
wherein the second display region is adjacent to the first display region and is outside the region of interest.

2. The HMD apparatus of claim 1, wherein the reference angle is set to an angle of in a range 10° to 40°.

3. The HMD apparatus of claim 1, wherein a cross-sectional area of the display is smaller than a cross-sectional area of the optical lens.

4. The HMD apparatus of claim 1, wherein the at least one eye-tracking sensor is further configured to obtain biometric information about the user by receiving the reflected light.

5. The HMD apparatus of claim 1, wherein the display comprises:
a substrate;
a circuit layer on the substrate; and
a plurality of pixels on the circuit layer, the plurality of pixels comprising the first pixels and the second pixels, and
wherein the first side of the display is adjacent to the plurality of pixels, and the second side of the display is adjacent to the substrate.

6. The HMD apparatus of claim 5, wherein the substrate is above the at least one eye-tracking sensor, and
wherein the at least one eye-tracking sensor overlaps an area of the substrate corresponding to an outside of the first display region.

7. The HMD apparatus of claim 5, wherein the substrate is above the at least one light source, and
wherein the at least one light source overlaps an area of the substrate corresponding to the second display region.

8. The HMD apparatus of claim 7, wherein the second display region comprises a first sub-display region and a second sub-display region,
wherein the at least one eye-tracking sensor is in the first sub-display region, and
wherein the at least one light source is in the second sub-display region.

9. The HMD apparatus of claim 5, wherein each of the plurality of pixels comprises an organic light emitting diode.

10. The HMD apparatus of claim 1, wherein a first distance between the eye of the user and the optical lens is less than a second distance between the eye of the user and the display.

11. The HMD apparatus of claim 1,
wherein the display comprises a first display corresponding to a left eye of the user and a second display corresponding to a right eye of the user,
wherein the optical lens comprises a first optical lens corresponding to the first display and a second optical lens corresponding to the second display, and
wherein the at least one eye-tracking sensor comprises at least one first eye-tracking sensor corresponding to the first display and at least one second eye-tracking sensor corresponding to the second display.

12. The HMD apparatus of claim 11, wherein the at least one light source comprises at least one first eye-tracking light source corresponding to the first display and at least one second eye-tracking light source corresponding to the second display.

13. The HMD apparatus of claim 1, wherein a transmittance of the second display region is greater than a transmittance of the first display region.

14. A head mounted display (HMD) apparatus comprising:
a display;
an optical lens adjacent to a first side of the display;
at least one light source configured to emit light;
at least one eye-tracking sensor adjacent to a second side of the display and configured to receive reflected light, the reflected light being the light emitted from the at least one light source and reflected from an eye of a user;
a memory storing at least one instruction; and
at least one processor configured to execute the at least one instruction to obtain gaze information about the user based on the reflected light received by the at least one eye-tracking sensor,
wherein the display comprises a second display region corresponding to a position of the at least one eye-tracking sensor, and a first display region other than the second display region,
wherein the first display region comprises first pixels and the second display region comprises second pixels,
wherein a spacing between two adjacent pixels of the first pixels is less than a spacing between two adjacent pixels of the second pixels,
wherein the first display region corresponds to a region of interest having a reference radius corresponding to a reference angle, which is predetermined based on a center of the optical lens, and a distance between the eye of the user and the optical lens, and
wherein the second display region is adjacent to the first display region and is outside the region of interest.

15. The HMD apparatus of claim 14,
wherein the reference angle is set to an angle in a range of 10° to 40°.

16. The HMD apparatus of claim 14, wherein the display comprises a first display corresponding to a left eye of the user and a second display corresponding to a right eye of the user,
wherein the optical lens comprises a first optical lens corresponding to the first display and a second optical lens corresponding to the second display,
wherein the at least one eye-tracking sensor comprises at least one first eye-tracking sensor corresponding to the first display and at least one second eye-tracking sensor corresponding to the second display, and
wherein the at least one light source comprises at least one first eye-tracking light source corresponding to the first display and at least one second eye-tracking light source corresponding to the second display.

17. An operating method of a head mounted display (HMD) apparatus comprising a display and an optical lens adjacent to a first side of the display, the operating method comprising:
emitting, by at least one light source of the HMD apparatus, light toward eyesan eye of a user;
receiving, by at least one eye-tracking sensor of the HMD apparatus adjacent to a second side of the display, reflected light, the reflected light being the light emitted from the at least one light source and reflected from the eye of the user; and
obtaining gaze information about the user based on the reflected light,
wherein the display comprises a second display region corresponding to a position where the at least one eye-tracking sensor, and a first display region other than the second display region,
wherein the first display region comprises first pixels and the second display region comprises second pixels,
wherein a spacing between two adjacent pixels of the first pixels is less than a spacing between two adjacent pixels of the second pixels,
wherein the first display region corresponds to a region of interest having a reference radius corresponding to a reference angle, which is predetermined based on a center of the optical lens, and a distance between the eye of the user and the optical lens, and
wherein the second display region is adjacent to the first display region and outside the region of interest.

18. The operating method of claim 17,
wherein the reference angle is set to an angle in a range of 10° to 40°.

19. The operating method of claim 17, wherein the display comprises a first display corresponding to a left eye of the user and a second display corresponding to a right eye of the user,
- wherein the optical lens comprises a first optical lens corresponding to the first display and a second optical lens corresponding to the second display,
- wherein the at least one eye-tracking sensor comprises at least one first eye-tracking sensor corresponding to the first display and at least one second eye-tracking sensor corresponding to the second display, and
- wherein the at least one light source comprises at least one first eye-tracking light source corresponding to the first display and at least one second eye-tracking light source corresponding to the second display.

* * * * *